(12) United States Patent
Maeda

(10) Patent No.: US 10,307,839 B2
(45) Date of Patent: Jun. 4, 2019

(54) END MILL

(71) Applicant: MITSUBISHI HITACHI TOOL ENGINEERING, LTD., Tokyo (JP)

(72) Inventor: Katsutoshi Maeda, Shiga (JP)

(73) Assignee: MITSUBISHI HITACHI TOOL ENGINEERING, LTD., Tokyo (JP)

( * ) Notice: Subject to any disclaimer, the term of this patent is extended or adjusted under 35 U.S.C. 154(b) by 34 days.

(21) Appl. No.: 15/558,120

(22) PCT Filed: Mar. 14, 2016

(86) PCT No.: PCT/JP2016/057928
§ 371 (c)(1),
(2) Date: Sep. 13, 2017

(87) PCT Pub. No.: WO2016/152611
PCT Pub. Date: Sep. 29, 2016

(65) Prior Publication Data
US 2018/0036809 A1 Feb. 8, 2018

(30) Foreign Application Priority Data
Mar. 20, 2015 (JP) .................... 2015-058400

(51) Int. Cl.
*B23C 5/10* (2006.01)
*B23P 15/34* (2006.01)

(52) U.S. Cl.
CPC .......... *B23C 5/10* (2013.01); *B23C 2210/084* (2013.01); *B23C 2210/203* (2013.01);
(Continued)

(58) Field of Classification Search
CPC ........ B23C 2210/0485; B23C 2210/20; B23C 2210/203; B23C 2210/084;
(Continued)

(56) References Cited

U.S. PATENT DOCUMENTS 4,721,421 A * 1/1988 Klinger .................... B23C 5/10
407/116
5,173,014 A 12/1992 Agapiou et al.
(Continued)

FOREIGN PATENT DOCUMENTS

| CN | 101085474 | 12/2007 | | |
|---|---|---|---|---|
| JP | 11216609 A | * 8/1999 | ............... | B23C 5/10 |

(Continued)

OTHER PUBLICATIONS

International Search Report dated Apr. 12, 2016 in corresponding International Patent Application No. PCT/JP2016/057928.
(Continued)

*Primary Examiner* — Sara Addisu

(57) ABSTRACT

Square end mill includes long end cutting edge disposed from end portion on outer peripheral side in radial direction to center in the radial direction when a cutting edge portion is viewed from end face side, and short end cutting edges disposed from other end portions on outer peripheral side in radial direction to middles on center side in radial direction, first gashes disposed on regions from lines connecting end portions on center side in radial direction of the short end cutting edges to center in radial direction to the long end cutting edge on rear side in the rotation direction, second and third gashes disposed on rear and front sides in rotation direction of the first gashes, and all gashes formed in curved surface shapes depressed to a shank side on opposite side in axial direction of the cutting edge portion.

20 Claims, 7 Drawing Sheets

(52) U.S. Cl.
CPC ...... *B23C 2210/40* (2013.01); *B23C 2210/54* (2013.01); *B23C 2210/64* (2013.01); *B23C 2230/00* (2013.01); *B23P 15/34* (2013.01)

(58) Field of Classification Search
CPC ............ B23C 2210/40; B23C 2210/54; B23C 2210/64; B23C 2230/00; B23C 5/10; B23P 15/34
See application file for complete search history.

(56) References Cited

U.S. PATENT DOCUMENTS

| | | | |
|---|---|---|---|
| 5,467,670 A | 11/1995 | Alverio | |
| 6,435,780 B1* | 8/2002 | Flynn | B23C 5/10 |
| | | | 407/53 |
| 2003/0180104 A1* | 9/2003 | Kuroda | B23C 5/10 |
| | | | 407/54 |
| 2007/0286691 A1 | 12/2007 | Glimpel et al. | |
| 2013/0078044 A1* | 3/2013 | Sharivker | B23C 5/10 |
| | | | 407/54 |
| 2015/0030396 A1* | 1/2015 | Abe | B23C 5/28 |
| | | | 407/11 |
| 2015/0037105 A1* | 2/2015 | Fukata | B23C 5/28 |
| | | | 407/11 |
| 2015/0174672 A1* | 6/2015 | Baba | B23C 5/10 |
| | | | 407/54 |
| 2015/0266113 A1* | 9/2015 | Fukata | B23C 5/10 |
| | | | 407/11 |
| 2016/0001382 A1* | 1/2016 | Takahashi | B23C 5/10 |
| | | | 407/54 |
| 2016/0031018 A1* | 2/2016 | Ota | B23C 5/10 |
| | | | 407/53 |
| 2016/0082526 A1* | 3/2016 | Swift | B23C 5/28 |
| | | | 407/11 |
| 2016/0214187 A1* | 7/2016 | Fukata | B23C 5/10 |
| 2017/0326655 A1* | 11/2017 | Kuroda | B23C 5/10 |
| 2018/0071839 A1* | 3/2018 | Hosokawa | B23C 5/10 |

FOREIGN PATENT DOCUMENTS

| | | | | |
|---|---|---|---|---|
| JP | 2004-276142 | | 10/2004 | |
| JP | 2006-110683 | | 4/2006 | |
| JP | 2007-296588 | | 11/2007 | |
| JP | 2006-15418 | | 1/2008 | |
| JP | 2010264592 A | * | 11/2010 | |
| JP | 2011062807 A | * | 3/2011 | |
| JP | 2011-67928 | | 4/2011 | |
| JP | 2011-189463 | | 9/2011 | |
| JP | 2012-91306 | | 5/2012 | |
| JP | 2013188843 A | * | 9/2013 | ............... B23C 5/28 |
| WO | WO 2013/099954 A1 | | 7/2013 | |
| WO | WO 2014/069264 A1 | | 5/2014 | |

OTHER PUBLICATIONS

Extended European Search Report dated Oct. 22, 2018 in European Patent Application No. 16768514.8.
Chinese Office Action dated Nov. 2, 2018 in corresponding Chinese Patent Application No. 201680011271.4.

\* cited by examiner

END MILL

CROSS-REFERENCE TO RELATED APPLICATIONS

This application is a U.S. National Stage Application which claims the benefit under 35 U.S.C. 371 of PCT International Patent Application No. PCT/JP2016/057928, filed Mar. 14, 2016 which claims the foreign priority benefit under 35 U.S.C. § 119 to Japanese Patent Application No. 2015-058400 filed Mar. 20, 2015, the contents of which are incorporated herein by reference.

TECHNICAL FIELD

The present invention relates to an end mill appropriate for a cutting machining on a difficult-to-machine material such as stainless steel.

BACKGROUND ART

An end mill is mainly used for a side cutting, a groove cutting, and similar cutting in mold machining. However, in parts machining on difficult-to-machine material (work material) such as stainless steel, a service life of a tool tends to be decreased due to chip easily welded on a tip of a cutting edge. In this respect, the end mill is requested to have a function to improve machining efficiency to reduce a machining time for prolonging the service life of the tool.

The chip welded on the tip of the cutting edge is caused by the chip immediately after a cutting by the cutting edge not to be discharged from a rake face immediately. Then, it is considered that sufficiently ensuring a dischargeability of the chip from a cutting edge rake face avoids the chip from being welded.

As means to improve the chip dischargeability from the cutting edge rake face, there has been a method that a plurality of gash faces are formed to constitute gashes continuous with the rake faces and chip discharge grooves, so as to guide the chip on the rake faces to the chip discharge grooves (see Patent Documents 1 to 5).

Patent Documents 1 to 5 each include the end cutting edge rake faces and the gashes constituted of the plurality of the gash faces opposing the end cutting edge rake faces on a front side in a rotation direction, and have the plurality of the gash faces opposing the end cutting edge rake faces inclined from a center side in a radial direction to an outer peripheral side by an angle close to a rotation axis of a tool body, so as to guide the chip from the gashes to the chip discharge grooves.

CITATION LIST

Patent Documents

Patent Document 1: Japanese Unexamined Patent Application Publication No. 2012-91306 (Claim 1, Paragraphs 0041 to 0042, and FIG. 5)
Patent Document 2: Japanese Unexamined Patent Application Publication No. 2011-67928 (Claim 2, Paragraph 0048, and FIG. 8)
Patent Document 3: Japanese Unexamined Patent Application Publication No. 2006-110683 (Paragraphs 0015 to 0032, and FIG. 2-FIG. 4)
Patent Document 4: Japanese Unexamined Patent Application Publication No. 2007-296588 (Claim 1, Paragraph 0006, and FIG. 1)
Patent Document 5: Japanese Unexamined Patent Application Publication No. 2006-15418 (Claim 1, Paragraphs 0016 to 0018, and FIG. 1)

DISCLOSURE OF THE INVENTION

Problems to be Solved by the Invention

In focusing on the chip dischargeability by using the gashes, it is considered effective to ensure a volume of the gash itself. However, Patent Documents 1 to 5 each include the gashes themselves having planar faces, thus they are not formed in shapes for increasing the volumes of the gashes. Furthermore, the plurality of the gash faces inclined from a tool tip side to a shank side in two stages cause the gashes themselves to have multangular shapes convex toward the outer peripheral side in the radial direction of the tool body, thus failing to provide large volumes for the gashes.

The gashes themselves in the convex multangular shapes contribute to increase rigidity of the tool body while failing to earn (increase) the volumes of the gashes themselves, thus the advantage of the improvement of the chip dischargeability caused by forming the plurality of the gash faces is not taken.

In consideration of the above background, the present invention proposes an end mill configured to enhance chip capacities on respective gashes and improve the chip dischargeability in guiding the chip on the rake faces to the chip discharge grooves with the plurality of the gashes (gash faces) formed on the cutting edge portions.

Solutions to the Problems

An end mill of the invention according to claim 1 has a cutting edge portion that includes an end cutting edge and a peripheral cutting edge, the cutting edge portion is disposed on a tip side in an axial direction of a tool body, the end cutting edge is disposed from a center side to an outer peripheral side in a radial direction, the peripheral cutting edge is continuous with the end cutting edge. The end cutting edge includes at least one long end cutting edge and at least two short end cutting edges, the long end cutting edge is continuously disposed from an end portion on the outer peripheral side in the radial direction to closer to a center in the radial direction when the cutting edge portion is viewed from an end face side in an axial direction, and the short end cutting edges are continuously disposed from other end portions on the outer peripheral side in the radial direction to middles on the center side in the radial direction when the cutting edge portion is viewed from the end face side in the axial direction.

The each short end cutting edge includes a first gash on a region from a line connecting the end portion on the center side in the radial direction to a proximity of the center in the radial direction to each of the long end cutting edges on rear sides in the rotation direction, the first gash has a rear side in the rotation direction and a front side in the rotation direction where a second gash and a third gash are formed respectively, and the first gash, the second gash, and the third gash are formed in curved surface shapes depressed to a shank side on an opposite side in the axial direction of the cutting edge portion when the cutting edge portion is viewed from the end face side in the axial direction.

As illustrated in FIG. 2, when a cutting edge portion 2 is viewed from the end face side in the axial direction, a long end cutting edge 4a (4c) is an end cutting edge where an end portion on the center side in the radial direction of the end cutting edge reaches a proximity of a rotation axis O of the tool body (an end mill 1), and the short end cutting edges 4b and 4d are end cutting edges where the end portions on the center side in the radial direction do not reach the proximities of the rotation axis O. Here, "the end portions on the center side in the radial direction of the end cutting edges (long end cutting edges 4a and 4c) that reach the proximities of the rotation axis O" are "starting points (beginning points) a2 and c2 of the long end cutting edges 4a and 4c" described below, and "the end portions on the center side in the radial direction of the end cutting edges (4b and 4d) that do not reach the proximities of the rotation axis O" are "starting points (beginning points) b2 and d2 of short end cutting edges 4b and 4d."

The end mill 1 of the present invention includes at least one long end cutting edge 4a (4c), and at least two short end cutting edges 4b and 4d, thus the end mill 1 has a configuration of three or more cutting edges in the number of the cutting edges. The drawings indicate an exemplary square end mill 1 of four cutting edges having two long end cutting edges 4a and 4c and two short end cutting edges 4b and 4d. "The end portion on the center side in the radial direction of the end cutting edge reaching the proximity of the rotation axis" means that the end cutting edges (the long end cutting edges 4a and 4c) are disposed until intersecting with a chisel edge 35 continuous from the end portions on the outer peripheral side in the radial direction to closer to the center in the radial direction.

"The other end portions b2 and d2 on the outer peripheral side in the radial direction" that identifies the starting points (beginning points) of the short end cutting edges 4b and 4d are end portions other than "the end portions on the outer peripheral side in the radial direction" of the long end cutting edges 4a and 4c, while both the long end cutting edges 4a and 4c and the short end cutting edges 4b and 4d are the end cutting edges, and a plurality of the end cutting edges are equally or approximately equally arranged in a circumferential direction (rotation direction R) of the tool body. Accordingly, the end portions on the outer peripheral side in the radial direction are disposed on positions equally or approximately equally arranged in the circumferential direction excluding "the end portions on the outer peripheral side in the radial direction of the long end cutting edges" along with the long end cutting edges 4a and 4c in the circumferential direction. "Equally arranged in the circumferential direction" means that, without distinctions between the long end cutting edges 4a and 4c and the short end cutting edges 4b and 4d, center angles between the end cutting edges 4a and 4b (4b and 4c) or peripheral cutting edges 15a and 15b (15b and 15c), which are adjacent in the circumferential direction, are constant, and "approximately equally arranged in the circumferential direction" means that, as illustrated in FIG. 12, center angles α and β between the end cutting edges or the peripheral cutting edges, which are adjacent in the circumferential direction, are not constant.

"The first gashes 7a and 7b, the second gashes 8a and 8b, and the third gashes 10a and 10b formed in the depressed curved surface shapes" according to claim 1 indicate surfaces of the respective gashes facing the end face (tip) side of the cutting edge portion 2 illustrated in FIG. 2. "The shank side" means an opposite side of the cutting edge portion 2 when the tool body is axially viewed, and "the depressed curved surface shape to the shank side" means that the surfaces of the respective gashes are depressed to the shank 3 side when the cutting edge portion 2 is viewed from the end face side in the axial direction.

As illustrated in FIG. 2, the end portions (the starting points a2 and c2 of the long end cutting edges 4a and 4c) on the center side in the radial direction of the long end cutting edges 4a and 4c are positioned at the proximities of the rotation axis O of the tool body, while the end portions (the starting points b2 and d2 of the short end cutting edges 4b and 4d) on the center side in the radial direction of the short end cutting edges 4b and 4d do not reach the proximities of the rotation axis O. The starting points b2 and d2 of the short end cutting edges 4b and 4d are points partitioning short end cutting edge flanks (short end cutting edge second faces 5b and 5d) disposed continuous to the rear sides in the rotation direction of the short end cutting edges 4b and 4d.

The short end cutting edge flanks (the short end cutting edge second faces 5b and 5d) are lying on the outer peripheral side in the radial direction of the first gashes 7a and 7b. "The short end cutting edge flanks" mean only the short end cutting edge second faces 5b and 5d disposed continuous to the rear sides in the rotation direction R of the short end cutting edges 4b and 4d in some cases, while including short end cutting edge third faces 6b and 6d disposed continuous to the rear sides in the rotation direction of the short end cutting edge second faces 5b and 5d in other cases.

When the cutting edge portion 2 is viewed from the end face side in the axial direction, boundary lines (first boundary lines 30a and 30b) on front sides in the rotation direction R of the first gashes 7a and 7b are continuous with the starting points b2 and d2 of the short end cutting edges 4b and 4d. The boundary lines (the first boundary lines 30a and 30b) once extend to the center side in the radial direction, project to the third gashes 10a and 10b sides on the front sides in the rotation direction in the middle, and subsequently, return to the second gashes 8a and 8b sides on the rear sides in the rotation direction so as to be continuous with the starting points a2 and c2 as the end portions on the center side in the radial direction of the long end cutting edges 4a and 4c (claim 3). The long end cutting edges 4a and 4c are disposed from the starting points a2 and c2 toward the outer peripheral side in the radial direction. The first boundary lines 30a and 30b are boundary lines between the first gashes 7a and 7b and the third gashes 10a and 10b.

In such case (claim 3) of a configuration where the boundary lines (the first boundary lines 30a and 30b) between the first gashes 7a and 7b and the third gashes 10a and 10b partially project to the third gashes 10a and 10b sides, a part of the chip in the first gashes 7a and 7b easily enters into the third gashes 10a and 10b directly, thus the efficiency for guiding the chip to the third gashes 10a and 10b is expected.

However, as disclosed in Patent Document 2 (FIG. 3), in a case of a configuration where the first boundary lines 30a and 30b project to the third gashes 10a and 10b sides directly from the starting points b2 and d2 of the short end cutting edges 4b and 4d, the efficiency for guiding the chip to the third gashes 10a and 10b can be said to be specifically enhanced. On the other hand, since the configuration decreases volumes of the third gashes 10a and 10b, capacities for the chip, which is cut off by the short end cutting edges 4b and 4d and entered into the third gashes 10a and 10b, are decreased so as to easily cause stay of the chip in the third gashes 10a and 10b.

Therefore, the first boundary lines 30a and 30b that once extend to the center side in the radial direction from the starting points b2 and d2 of the short end cutting edges 4b and 4d, project to the third gashes 10a and 10b sides, and return to the second gashes 8a and 8b sides (claim 3) ensures reducing the influence of the decreased volumes of the third gashes 10a and 10b, thus enhancing the chip capacities of the third gashes 10a and 10b compared with Patent Document 2. As the result, the efficiency for guiding the chip in the first gashes 7a and 7b to the third gashes 10a and 10b can be enhanced while not decreasing the capacities of the third gashes 10a and 10b for the chip cut off by the short end cutting edges 4b and 4d but maintaining to some extent.

The efficiency is significantly provided especially in a case (claim 4) where the first boundary lines 30a and 30b are formed in ridgelines convex to the end face side of the cutting edge portion 2, or a case (claim 6) where the third gashes 10a and 10b have faces (surfaces) excluding the first boundary lines 30a and 30b depressed with respect to the first boundary lines 30a and 30b, because the chip in the first gashes 7a and 7b easily drops into the third gashes 10a and 10b. "The first boundary lines 30a and 30b formed in the ridgelines convex to the end face side of the cutting edge portion 2" means that the first boundary lines 30a and 30b form lines relatively projected to the end face side with respect to the surfaces of the third gashes 10a and 10b and the first gashes 7a and 7b on both sides across the first boundary lines 30a and 30b when the cutting edge portion 2 is viewed from the end face side. However, in focusing on the first boundary lines 30a and 30b themselves, the first boundary lines 30a and 30b themselves form depressed curved lines viewed from the end face side of the cutting edge portion 2.

From the end portions (the starting point b2 and d2 of the short end cutting edges 4b and 4d) on the center side in the radial direction of the short end cutting edges 4b and 4d, sixth boundary lines 37a and 37b as boundary lines between the short end cutting edge flanks (the short end cutting edge second faces 5b and 5d, or the short end cutting edge second faces 5b and 5d and the short end cutting edge third faces 6b and 6d) and the first gashes 7a and 7b are disposed continuous to the rear sides in the rotation direction. Therefore, in other words, the first gashes 7a and 7b can be said "to be formed on a region from sections closer to the center in the radial direction of rake faces 11a and 11c of the long end cutting edges 4a and 4c to the short end cutting edge flanks continuous to the rear sides in the rotation direction of the respective short end cutting edges 4b and 4d including the end portions (b2 and d2) on the center side in the radial direction of the short end cutting edges 4b and 4d on the front sides in the rotation direction".

From intersections b3 and d3 of the sixth boundary lines 37a and 37b with boundary lines (boundary lines with a flute 17a) on the rear sides in the rotation direction of the short end cutting edge flanks (the short end cutting edge second faces 5b and 5d, or the short end cutting edge third faces 6b and 6d), second boundary lines 31a and 31b as boundary lines between the first gashes 7a and 7b and the second gashes 8a and 8b are disposed continuous to the proximities of the center in the radial direction toward the rake faces 11a and 11c (of the long end cutting edges 4a and 4c). The ends are continuous with the long end cutting edges 4a and 4c or the rake faces 11a and 11c. The second gashes 8a and 8b are formed on the rear sides in the rotation direction of the second boundary lines 31a and 31b to the boundary lines (the third boundary lines 32a and 32b) with the flute 17a of the sections closer to the outer periphery in the radial direction of the rake faces 11a and 11c of the long end cutting edges 4a and 4c.

Therefore, in other words, the second gashes 8a and 8b can be said "to be formed on a region on the rear sides in the rotation direction of the first gashes 7a and 7b to the long end cutting edge rake faces 11a and 11c, or a region from the boundary lines (the second boundary lines 31a and 31b) (passing through the intersections b3 and d3) on the rear sides in the rotation direction of the short end cutting edge flanks (the short end cutting edge second faces 5b and 5d, or the short end cutting edge third faces 6b and 6d) to the long end cutting edges 4a and 4c or the long end cutting edge rake faces 11a and 11c (the third boundary lines 32a and 32b) on the rear sides in the rotation direction." Then, in other words, the first gashes 7a and 7b can be said "to be formed over a region from the first boundary lines 30a and 30b passing through the end portions (b2 and d2) closer to the center in the radial direction of the short end cutting edges 4b and 4d to the second boundary lines 31a and 31b (passing through the intersections b3 and d3) on the rear sides in the rotation direction of the short end cutting edge flanks."

The third gashes 10a and 10b are formed on the front sides in the rotation direction of sections (including the starting points b2 and d2 of the short end cutting edges 4b and 4d) closer to the center in the radial direction of the short end cutting edges 4b and 4d and the first boundary lines 30a and 30b continuous with the sections to boundaries (fourth boundary lines 36a and 36b) with the long end cutting edge flanks (long end cutting edge second faces 5a and 5c or long end cutting edge third faces 6a and 6c) continuous to the rear sides in the rotation direction of the long end cutting edges 4a and 4c lying on the sides. Therefore, in other words, the third gashes 10a and 10b can be said "to be formed on a region from the sections closer to the center in the radial direction of rake faces 11b and 11d of the short end cutting edges 4b and 4d to the front sides in the rotation direction of the first gashes 7a and 7b, or on a region from the boundary lines (the fourth boundary lines 36a and 36b) on the third gashes 10a and 10b sides of the long end cutting edge flanks to the short end cutting edges 4b and 4d and the first gashes 7a and 7b on the rear sides in the rotation direction.

The second gashes 8a and 8b are disposed on the rear sides in the rotation direction of the first gashes 7a and 7b while being disposed so as to be continuous with the long end cutting edge rake faces 11a and 11c with the first gashes 7a and 7b as illustrated in FIG. 3. Then, the second gashes 8a and 8b are arranged along ridgelines of the long end cutting edges 4a and 4c or surfaces of the long end cutting edge rake faces 11a and 11c with the first gashes 7a and 7b.

As illustrated in the drawings, in a case of the end mill having uneven type four cutting edges when the cutting edge portion 2 is viewed from the end face side in the axial direction, the short end cutting edges 4b and 4d intersect with the long end cutting edges 4a and 4c vertically or with an angle close to vertical. Then, as illustrated in FIG. 2, the third gashes 10a and 10b are disposed on the front sides in the rotation direction of the first gashes 7a and 7b while being arranged along the long end cutting edges 4a and 4c or the long end cutting edge rake faces 11a and 11c so as to sandwich the first gashes 7a and 7b with the second gashes 8a and 8b in the ridgeline direction of the long end cutting edges 4a and 4c or the radial direction.

Consequently, the third gashes 10a and 10b and the second gashes 8a and 8b are disposed across the first gashes 7a and 7b in the ridgeline directions of the long end cutting edges 4a and 4c so as to be arranged along the ridgelines of the long end cutting edges 4a and 4c (claim 2). "Along the long end cutting edges 4a and 4c" in claim 2 means "along the ridgelines of the long end cutting edges 4a and 4c." On the rear sides in the rotation direction of the second gashes 8*a* and 8*b* and the third gashes 10*a* and 10*b,* the flutes (the chip discharge grooves) 17*a*, 17*b*, 17*c*, and 17*d* are continuously disposed respectively.

The third gashes 10*a* and 10*b* and the second gashes 8*a* and 8*b* disposed across the first gashes 7*a* and 7*b* along the ridgelines of the long end cutting edges 4*a* and 4*c* (claim 2), and the third gashes 10*a* and 10*b* and the second gashes 8*a* and 8*b* positioned on both sides of the first gashes 7*a* and 7*b* along the ridgelines of the long end cutting edges 4*a* and 4*c* cause the chip cut off by the long end cutting edges 4*a* and 4*c* and entered into the first gashes 7*a* and 7*b* to be dispersed to the second gashes 8*a* and 8*b* and the third gashes 10*a* and 10*b*. The chip dispersed to the second gashes 8*a* and 8*b* and the third gashes 10*a* and 10*b* is discharged to the flutes 17*d*, 17*b*, 17*a*, and 17*c* continuous to the respective rear sides in the rotation direction.

The chip cut off by the long end cutting edges 4*a* and 4*c* and entered into the second gashes 8*b* and 8*a* is discharged to the flutes 17*d* and 17*b* continuous to the rear sides in the rotation direction. The chip cut off by the short end cutting edges 4*b* and 4*d* and entered into the third gashes 10*a* and 10*b* is discharged to the flutes 17*d* and 17*b* continuous to the rear sides in the rotation direction. The first gashes 7*a* and 7*b* and the third gashes 10*a* and 10*b* have the surfaces in depressed curved surface shapes as illustrated in FIG. 3 and FIG. 4, and the surfaces are inclined from the boundary lines (the first boundary lines 30*a* and 30*b*) between both gashes to the flutes 17*b* and 17*a* on the rear sides in the rotation direction of the respective gashes in a direction from the cutting edge portion 2 to the shank 3 for chip discharge to the flutes 17*b* and 17*a* on the rear sides in the rotation direction.

Here, when there is no particular level difference between the surfaces of the first gashes 7*a* and 7*b* and the surfaces of the third gashes 10*a* and 10*b*, it is considered that the chip entered into the first gashes 7*a* and 7*b* has a strong tendency to be discharged to the flutes 17*b* and 17*d* on the rear sides in the rotation direction via the second gashes 8*a* and 8*b* disposed on the rear sides in the rotation direction. Therefore, the boundary lines (the first boundary lines 30*a* and 30*b*) between the third gashes 10*a* and 10*b* and the first gashes 7*a* and 7*b* formed in ridgelines convex to the end face side of the cutting edge portion 2 (claim 4) allow a part of the chip entered into the first gashes 7*a* and 7*b* to easily enter (drop) into the third gashes 10*a* and 10*b* directly.

"The boundary lines (the first boundary lines 30*a* and 30*b*) between the third gashes 10*a* and 10*b* and the first gashes 7*a* and 7*b* formed in the convex ridgelines" means that the boundary lines convexly project to the end face side of the cutting edge portion 2. In other words, as described above, this can be said that, relatively, "the third gashes 10*a* and 10*b* have faces (surfaces (depressed curved surface)) excluding the boundary lines (the first boundary lines 30*a* and 30*b*) with the first gashes 7*a* and 7*b* deeply depressed (lying in the back) with respect to the boundary line with the first gashes 7*a* and 7*b* when the cutting edge portion 2 is viewed from the end face side in the axial direction" (claim 6).

The faces (depressed curved surface) of the third gashes 10*a* and 10*b* deeply depressed with respect to the boundary lines (the first boundary lines 30*a* and 30*b*) with the first gashes 7*a* and 7*b* allow a part of the chip in the first gashes 7*a* and 7*b* to easily enter (drop) into the third gashes 10*a* and 10*b*, thus increasing the tendency of the chip entered into the first gashes 7*a* and 7*b* to be dispersed to the second gashes 8*a* and 8*b* and the third gashes 10*a* and 10*b*. This avoids the chip from concentrating on any of the second gashes 8*a* and 8*b* or the third gashes 10*a* and 10*b* to stay.

Viewed from the boundary lines (the first boundary lines 30*a* and 30*b*) between the third gashes 10*a* and 10*b* and the first gashes 7*a* and 7*b*, as described above, as illustrated in FIG. 3, the faces (the surfaces) of the first gashes 7*a* and 7*b* and the faces (the surfaces) of the third gashes 10*a* and 10*b* are inclined from the boundary lines as the ridgelines to the flutes 17*b* and 17*a* on the rear sides in the rotation direction of the respective gashes in the direction from the cutting edge portion 2 to the shank 3. Consequently, the chip on the proximity of the boundary lines (the first boundary lines 30*a* and 30*b*) in the first gashes 7*a* and 7*b* is in a condition to easily enter into the third gashes 10*a* and 10*b* even on the front sides in the rotation direction equivalent to the second gashes 8*a* and 8*b* on the rear sides in the rotation direction, thus the chip in the first gashes 7*a* and 7*b* is easily dispersed to the second gashes 8*a* and 8*b* and the third gashes 10*a* and 10*b*.

The respective gashes having function to guide the chip to the flutes 17*a* to 17*d* include the surfaces inclined from the cutting edge portion 2 side to the shank 3 side as a whole toward the rear sides in the rotation direction, thus the surfaces on the rear sides are relatively deepened with respect to the surfaces on the front sides in the rotation direction when the cutting edge portion 2 is viewed from the end face side. In this relation, while depths of the surfaces of the respective gashes when the cutting edge portion 2 is viewed from the end face side cannot be directly compared, it can be said that relative differences of the depths between the boundary lines between the adjacent gashes and the gash surfaces cause the chip on the boundary lines (the first boundary lines 30*a* and 30*b*) to easily drop into the third gashes 10*a* and 10*b* because the surfaces of the third gashes 10*a* and 10*b* are deepened with respect to the boundary lines (the first boundary lines 30*a* and 30*b*) with the first gashes 7*a* and 7*b*.

As described above, when a part of the boundary lines (the first boundary lines 30*a* and 30*b*) between the first gashes 7*a* and 7*b* and the third gashes 10*a* and 10*b* have shapes projecting to the third gashes 10*a* and 10*b* sides (claim 3), the efficiency for guiding the chip in the first gashes 7*a* and 7*b* to the third gashes 10*a* and 10*b* is expected. Then, when the requirement of claim 3 is satisfied in any of claims 4 to 6, it can be said that the efficiency for guiding the chip in the first gashes 7*a* and 7*b* to the third gashes 10*a* and 10*b* is significant.

The chip entered into the first gashes 7*a* and 7*b* is easily dispersed to the second gashes 8*a* and 8*b* and the third gashes 10*a* and 10*b*, so as to reduce the concentration of the chip on the first gashes 7*a* and 7*b* or the second gashes 8*a* and 8*b* and the stay, thus easily discharging the chip from the first gashes 7*a* and 7*b* to the flutes 17*a* to 17*d* smoothly. Consequently, the chip dischargeability from the first gashes 7*a* and 7*b* improves to easily avoid welding on the tip of the cutting edge due to the stay of the chip, thus ensuring the service life of the tool to be lengthened.

Since the second gashes 8*a* and 8*b* have functions to accept the chip entered into the first gashes 7*a* and 7*b* to guide to the flutes 17*d* and 17*b* on the rear sides in the rotation direction, it is reasonable that the boundary lines (the second boundary lines 31*a* and 31*b*) between the second gashes 8*a* and 8*b* and the first gashes 7*a* and 7*b* are formed in the ridgelines convex to the end face side of the cutting edge portion 2, that is, the second gashes 8*a* and 8*b* are formed such that the second gashes 8*a* and 8*b* have faces excluding the boundary lines (the second boundary lines 31*a* and 31b) with the first gashes 7a and 7b deepened with respect to the boundary lines with the first gashes 7a and 7b (claim 5). The second boundary lines 31a and 31b formed in the ridgelines convex to the end face side of the cutting edge portion 2 allows a part of the chip entered into the second gashes 8a and 8b from the first gashes 7a and 7b to easily enter (drop) into the flutes 17d and 17b directly.

"The second boundary lines 31a and 31b formed in the ridgelines convex to the end face side of the cutting edge portion 2" means that the second boundary lines 31a and 31b formed in lines relatively projecting to the end face side with respect to the faces of the first gashes 7a and 7b and the second gashes 8a and 8b on both sides across the second boundary lines 31a and 31b when the cutting edge portion 2 is viewed from the end face side. However, in focusing on the second boundary lines 31a and 31b themselves, the second boundary lines 31a and 31b themselves form depressed curved lines viewed from the end face side of the cutting edge portion 2.

When the cutting edge portion 2 is viewed from the end face side in the axial direction, the first gashes 7a and 7b, the second gashes 8a and 8b, and the third gashes 10a and 10b have the faces (the surfaces) formed in the curved surface shapes depressed to the shank 3 side (claim 1), so as to increase the volumes of the respective gashes themselves compared with a case of flat faces (surfaces), thus enhancing the chip capacities of the respective gashes when the end mill includes a plurality of gashes (gash surfaces). This also avoids the stay of the chip in the respective gashes and contributes to improve the efficiency for discharging from the respective gashes to the flutes 17a to 17d, thus improving the chip dischargeability by using the gashes to more reduce the possibility of the welding of the chip on the tip of the cutting edge.

The present invention assumes that, as described above, the chip cut off by the short end cutting edges 4b and 4d once enters into the third gashes 10a and 10b. However, it is not necessarily as assumed because of the relation between the boundary lines (fifth boundary lines 34a and 34b) with the flutes 17a and 17c continuous to the rear sides in the rotation direction of the third gashes 10a and 10b and the end portions b2 and d2 on the center side in the radial direction of the short end cutting edges 4b and 4d.

Therefore, the boundary lines (the fifth boundary lines 34a and 34b) between the third gashes 10a and 10b and the flutes 17a and 17c are disposed continuous with the short end cutting edges 4b and 4d or the rake faces 11b and 11d of the short end cutting edges 4b and 4d, and when the cutting edge portion 2 is viewed from the end face side in the axial direction, the end portions b2 and d2 on the center side in the radial direction of the short end cutting edges 4b and 4d are positioned on the center side in the radial direction with respect to intersections b4 and d4 of the boundary lines (the fifth boundary lines 34a and 34b) between the third gashes 10a and 10b and the flutes 17c and 17d with the short end cutting edges 4b and 4d or the short end cutting edge rake faces 11b and 11d (claim 7), thus easily generating a condition where the chip cut off by the short end cutting edges 4b and 4d once enters into the third gashes 10a and 10b.

In this case, as illustrated in FIG. 2, the end portions b2 and d2 on the center side in the radial direction of the short end cutting edges 4b and 4d are positioned on the center side in the radial direction with respect to the boundary lines (the fifth boundary lines 34a and 34b) between the third gashes 10a and 10b and the flutes 17a and 17c, thus overlapping the short end cutting edges 4b and 4d and the third gashes 10a and 10b in the radial direction to allow the chip cut off by the short end cutting edges 4b and 4d to easily enter into the third gashes 10a and 10b. Half of the chip cut off by the short end cutting edges 4b and 4d directly enters into the flutes 17a and 17c continuous to the rear sides in the rotation direction of the third gashes 10a and 10b, and the chip dispersed to the chip directly entering into the flutes 17a and 17c and the chip entering into the third gashes 10a and 10b avoids the concentration and the stay of the chip in the flutes 17a and 17c, thus contributing to reduce the possibility of the welding on the tip of the cutting edge.

The first gashes 7a and 7b, the second gashes 8a and 8b, and the third gashes 10a and 10b each have a face (surface) formed in curved surface shape depressed to the shank 3 side when the cutting edge portion 2 is viewed from the end face side (claim 1), thus the boundary lines (the first boundary lines 30a and 30b) between the first gashes 7a and 7b and the third gashes 10a and 10b and the boundary lines (the fourth boundary lines 36a and 36b) between the third gashes 10a and 10b and the long end cutting edge flanks lying on the front sides in the rotation direction of the third gashes 10a and 10b are formed in the ridgelines convex to the end face side of the cutting edge portion 2.

In the present invention, the first boundary lines 30a and 30b and the fourth boundary lines 36a and 36b are formed in the convex ridgelines, and with the intersections of both boundary lines, extended lines (ridgelines continuous from the starting points a2 and c2) of the long end cutting edges 4a and 4c as convex ridgelines partitioning the center side in the radial direction of the first gashes 7a and 7b intersect. Accordingly, the intersection of these three convex ridgelines or a protrusion z including the intersection is a region convexly pointed to the end face side of the cutting edge portion 2 as illustrated in FIG. 11-(b). This relation causes the protrusion z to easily contact the work material during the drilling machining by the end mill 1, thus generating the possibility of the loss due to the contact.

Therefore, it is considered that fourth gashes 9a and 9b are formed on regions from the end portions closer to the front sides in the rotation direction or closer to the center in the radial direction of the boundary lines (the first boundary lines 30a and 30b) between the first gashes 7a and 7b and the third gashes 10a and 10b to the rear sides in the rotation direction (the long end cutting edge second faces 5a and 5c) of the long end cutting edges 4a and 4c lying on the front sides in the rotation direction of the end portions (claim 8). In this case, as illustrated in FIG. 11-(a), the protrusion z convexly pointed to the end face side of the cutting edge portion 2 can be made to be absent, thus the possibility of the loss due to the contact of the protrusion z with the work material is eliminated. "The end portions closer to the front sides in the rotation direction or closer to the center in the radial direction of the boundary lines (the first boundary lines 30a and 30b) between the first gashes 7a and 7b and the third gashes 10a and 10b" are intersections of the first boundary lines 30a and 30b with the fourth boundary lines 36a and 36b, and the extended lines of the long end cutting edges 4a and 4c, and "the rear sides in the rotation direction of the long end cutting edges 4a and 4c" are (the boundary lines of) the third gashes 10a and 10b sides of the long end cutting edge flanks (the long end cutting edge second faces 5a and 5c, or the long end cutting edge third faces 6a and 6c).

The fourth gashes 9a and 9b also formed in curved surface shapes depressed to the shank 3 side when the cutting edge portion 2 is viewed from the end face side in the axial direction similarly to the first to the third gashes ensure the fourth gashes 9a and 9b to have functions for decreasing the stay of the chip, thus reducing the possibility of the welding of the chip on the tip of the cutting edge in the fourth gashes 9a and 9b.

Effects of the Invention

A first gash formed on a region from a line connecting an end portion on a center side in a radial direction to a proximity of the center in the radial direction of an short end cutting edge to a long end cutting edge on a rear side in the rotation direction, and a second gash and a third gash formed on a rear side in the rotation direction and a front side in the rotation direction of the first gash are formed in curved surface shapes depressed to a shank side. This ensures increasing volumes of the respective gashes themselves when an end mill includes a plurality of the gashes, thus enhancing chip capacity in the respective gashes.

Consequently, stay of the chip in the respective gashes is avoided to improve dischargeability from the respective gashes to flutes, thus decreasing the possibility of welding of the chip on a tip of a cutting edge to ensure service life of a tool to be lengthened.

BRIEF DESCRIPTION OF THE DRAWINGS

FIG. 11-(b) is an arrow view (perspective view) taken along the line d-d in FIG. 2 in a case where a fourth gash is not formed.

DESCRIPTION OF PREFERRED EMBODIMENTS

Figure 1:
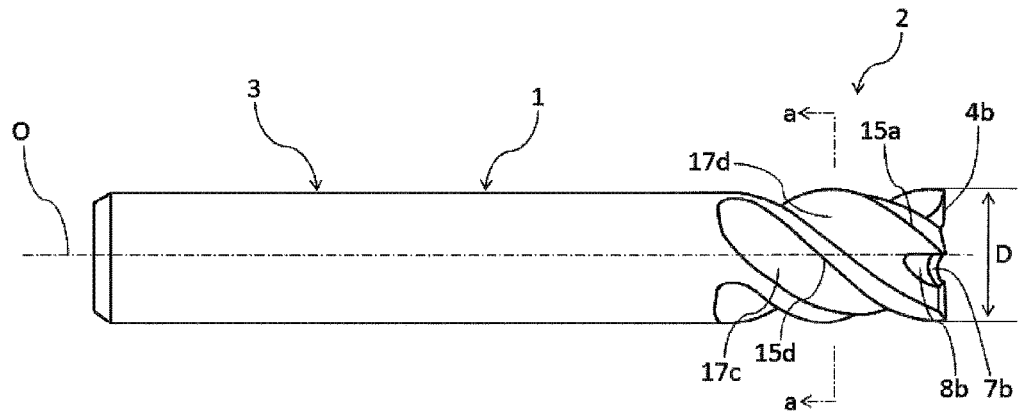
FIG. 1 is a side view illustrating an end mill in a case of four end cutting edges.
Figure 2:
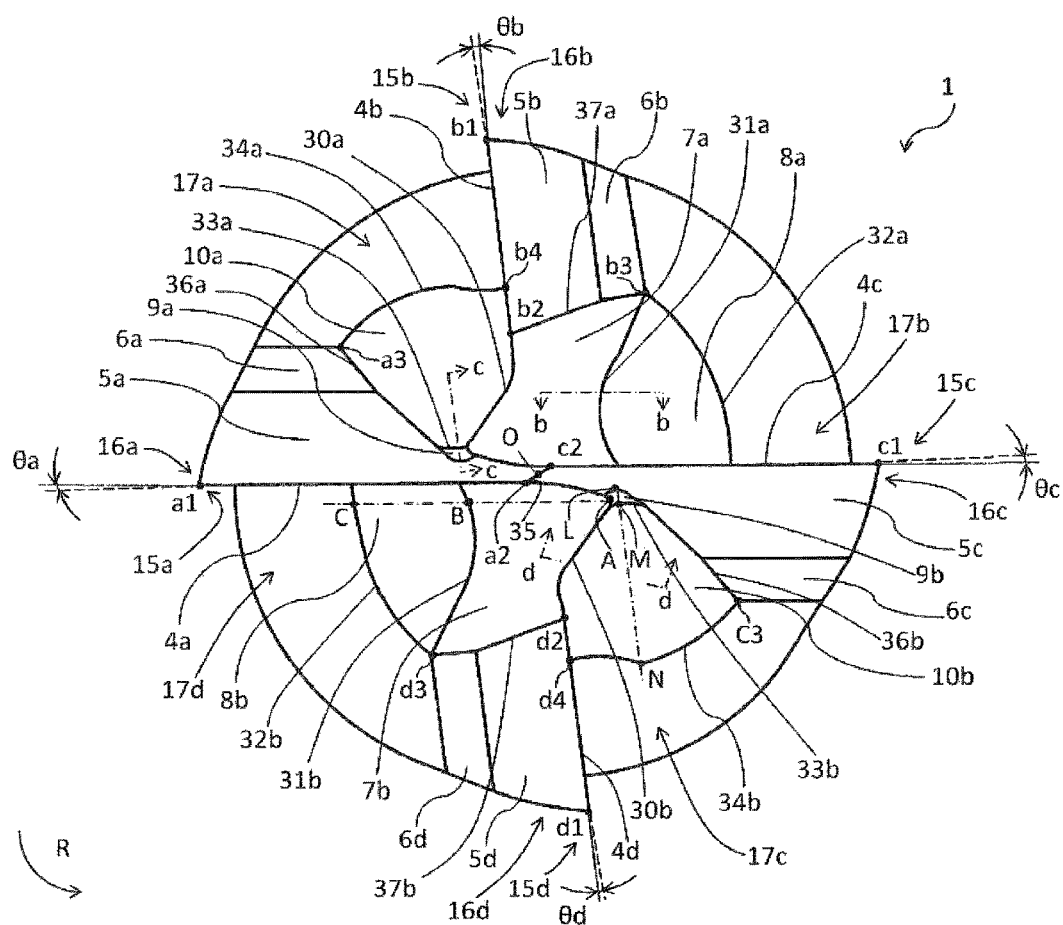
FIG. 2 is an end view illustrating an end face of a cutting edge portion side of FIG. 1.

FIG. 1 and FIG. 2 illustrate a manufacturing example of an end mill 1 that includes a cutting edge portion 2, which includes an end cutting edge and peripheral cutting edges 15a to 15d continuous with the end cutting edge from a center side in a radial direction to an outer peripheral side, on a tip side in an axial direction of a tool body. When the cutting edge portion 2 is viewed from an end face side in the axial direction, the cutting edge portion 2 includes at least one long end cutting edge 4a and 4c, which are continuous from an end portion on the outer peripheral side in the radial direction to closer to a center in the radial direction, and at least two short end cutting edges 4b and 4d, which are continuous from the other end portion on the outer peripheral side in the radial direction when the cutting edge portion 2 is viewed from the end face side in the axial direction to a middle of the center side in the radial direction.

In the drawings, an example of four cutting-edge that includes the end cutting edge constituted of two long end cutting edges 4a and 4c and two short end cutting edges 4b and 4d. However, the number of the cutting edges is appropriate with 3 to 8. When the number of the cutting edges is two or less, high-efficiency machining is difficult, and when he number of the cutting edges is nine or more, the gashes with sufficient volumes cannot be ensured, thus easily causing a chip clogging at a beginning of a cutting work.

The high-efficiency machining as an object of the end mill 1 of the present invention means a machining where conditions of a feed velocity Vf, an axial cutting amount ap, and a radial cutting amount ae are set such that a chip discharge amount Qr is $0.2 \times D^2$ (D: tool diameter) $cm^3/min$ or more. The chip discharge amount Qr is obtained by a conditional expression (1): $Qr=(ap \times ae)D \times Vf/1000$. For example, in a square end mill with four cutting-edge of D=10 mm, setting the feed velocity Vf to 450 mm/min, the axial cutting amount ap to 1 mm, and the radial cutting amount ae to 0.5 mm provide the chip discharge amount Qr of 22.5 $cm^3/min$, thus indicating the chip discharge amount of $0.2 \times 10^2 = 20$ $cm^3/min$ or more to achieve the high-efficiency machining condition.

In terms of usefulness, a base material of the end mill 1 of the present invention is preferably made of WC-based cemented carbide alloy, ceramic, or high-speed steel. As necessary, on a surface of the cutting edge portion 2 formed of the base material, a wear-resistant hard film is coated. As the hard film, for example, TiSiN, TiAlN, TiAlSiN, CrSiN, AlCrSiN, or similar material is employed. Specifically, it is preferred to coat with a mono-layer film or a laminated film including two or more selected among nitride, carbonitride, and oxynitride, which include at least one element selected among elements of Al, Si, and B as metals in periodic table 4A, 5A, and 6A groups with a thickness of 3 to 5 μm.

As illustrated in FIG. 2, first gashes 7a and 7b are formed on regions from lines (first boundary lines 30a and 30b), which connect from end portions (starting points b2 and d2 of the short end cutting edges 4b and 4d) on the center side in the radial direction of the short end cutting edges 4b and 4d to proximities of the center in the radial direction, to the respective long end cutting edges 4a and 4c on rear sides in the rotation direction. On rear sides in the rotation direction and front sides in the rotation direction of the first gashes 7a and 7b, second gashes 8a and 8b and third gashes 10a and 10b are formed respectively. The first gashes 7a and 7b, the second gashes 8a and 8b, and the third gashes 10a and 10b are formed in curved surface shapes depressed to the shank 3 side when the cutting edge portion 2 is viewed from the end face side in the axial direction.

From end portions (a1 and c1) on outer peripheral sides in the radial direction of the long end cutting edges 4a and 4c illustrated in FIG. 2, peripheral cutting edges 15a and 15c are continuously disposed respectively as illustrated in FIG.

Figure 3:
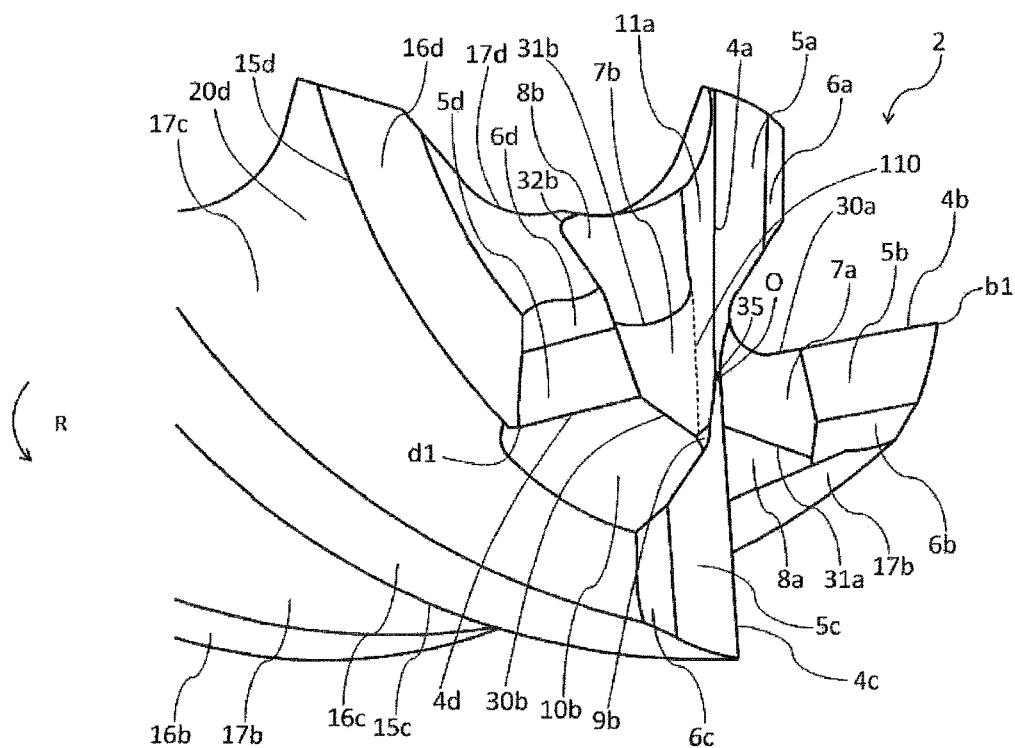
FIG. 3 is a perspective view illustrating the end face of FIG. 2 viewed from an outer peripheral side in a radial direction of a short end cutting edge.

4, and from end portions (b1 and d1) on outer peripheral sides in the radial direction of the short end cutting edges 4b and 4d, peripheral cutting edges 15b and 15d are continuously disposed respectively as illustrated in FIG. 3. Hereinafter, intersections of the end portions on the outer peripheral sides in the radial direction of the long end cutting edges 4a and 4c with the peripheral cutting edges 15a and 15c are referred to as connecting points a1 and c1, and intersections of the end portions on the outer peripheral sides in the radial direction of the short end cutting edges 4b and 4d with the peripheral cutting edges 15b and 15d are referred to as connecting points b1 and d1.

When the cutting edge portion 2 is viewed from the end face side in the axial direction, the long end cutting edges 4a and 4c are disposed continuous with the short end cutting edges 4b and 4d passing through the starting points a2 and c2 of the long end cutting edges 4a and 4c near the center in the radial direction of the cutting edge portion 2 as illustrated in FIG. 2. Lines continuous from the proximities of the center (the starting points a2 and c2 of the long end cutting edges 4a and 4c) in the radial direction of the long end cutting edges 4a and 4c to the short end cutting edges 4b and 4d are boundary lines (the first boundary lines 30a and 30b) between the first gashes 7a and 7b and the third gashes 10a and 10b.

The starting points a2 and c2 of the long end cutting edges 4a and 4c are also intersections of the long end cutting edges 4a and 4c with a chisel edge 35, and the first boundary lines 30a and 30b are continuous from the starting points a2 and c2 of the long end cutting edges 4a and 4c to the end portions b2 and d2 on the center side in the radial direction of the short end cutting edges 4b and 4d so as to form convex ridgelines. The first boundary lines 30a and 30b forming the convex ridgelines make the third gashes 10a and 10b, which are gashes partitioned by the first boundary lines 30a and 30b so as to be relatively close to flutes 17a and 17c, concave (depressed) to the shank 3 side with respect to the first boundary lines 30a and 30b, thus making relatively low (deepen) with respect to the first gashes 7a and 7b.

As a result, the chip existing near the first boundary lines 30a and 30b in the first gashes 7a and 7b easily move around to the second gashes 8a and 8b on the rear sides in the rotation direction, and simultaneously, the chip is also in a state of easily moving into (dropping into) the third gashes 10a and 10b on front sides in the rotation direction. Accordingly, the chip in the first gashes 7a and 7b is easily dispersed into the second gashes 8a and 8b and the third gashes 10a and 10b. Surfaces (depressed curved surfaces) of the first gashes 7a and 7b are also sometimes depressed to the shank 3 side with respect to the first boundary lines 30a and 30b.

Here, when the cutting edge portion 2 is viewed from the end face side in the axial direction, angles θa and θc between straight lines, which connect the respective connecting points a1 and c1 of the long end cutting edges 4a and 4c to a rotation axis O as the center in the radial direction of the cutting edge portion 2, indicated by dashed lines in FIG. 2 and straight lines drawn by the long end cutting edges 4a and 4c are appropriately 0 to 4°, preferably 0 to 2°. Similarly, angles θb and θd between straight lines, which connect the respective connecting points b1 and d1 of the short end cutting edges 4b and 4d to the rotation axis O, indicated by dashed lines and straight lines drawn by the short end cutting edges 4b and 4d are also appropriately 0 to 4°, preferably 0 to 2°. The θa to θd of less than 0° (negative angle) decrease rigidity of tip of the cutting edge, and the θa to θd exceeding 4° cause difficulty in forming the gashes.

On respective rear sides in the rotation direction of the long end cutting edges 4a and 4c, long end cutting edge second faces 5a and 5c are continuously disposed as long end cutting edge flanks, and on respective rear sides in the rotation direction of the short end cutting edges 4b and 4d, short end cutting edge second faces 5b and 5d are continuously disposed as short end cutting edge flanks. While the flutes 17a to 17d are sometimes continuous with rear sides in the rotation direction of the long end cutting edge second faces 5a and 5c and the short end cutting edge second faces 5b and 5d, in the drawings, long end cutting edge third faces 6a and 6c are disposed continuous with the respective rear sides in the rotation direction of the long end cutting edge second faces 5a and 5c, and short end cutting edge third faces 6b and 6d are disposed continuous with the rear sides in the rotation direction of the short end cutting edge second faces 5b and 5d such that the long end cutting edge second faces 5a and 5c and the short end cutting edge second faces 5b and 5d shift to the flutes 17a to 17d in phases.

Boundary lines (fourth boundary lines 36a and 36b) of the long end cutting edge flanks (the long end cutting edge second faces 5a and 5c and the long end cutting edge third faces 6a and 6c) and the third gashes 10a and 10b are formed in ridgelines convex to the end face side of the cutting edge portion 2, the boundary lines are continuous with the first boundary lines 30a and 30b via the proximity of the center in the radial direction (fourth gashes 9a and 9b described below), and the boundary lines are branched at the identical position to be also continuous with extended lines of the long end cutting edges 4a and 4c. The fourth boundary lines 36a and 36b forming the convex ridgelines cause the third gashes 10a and 10b, which are gashes partitioned by the fourth boundary lines 36a and 36b, to be concave (depressed) to the shank 3 side with respect to the fourth boundary lines 36a and 36b.

Figure 4:
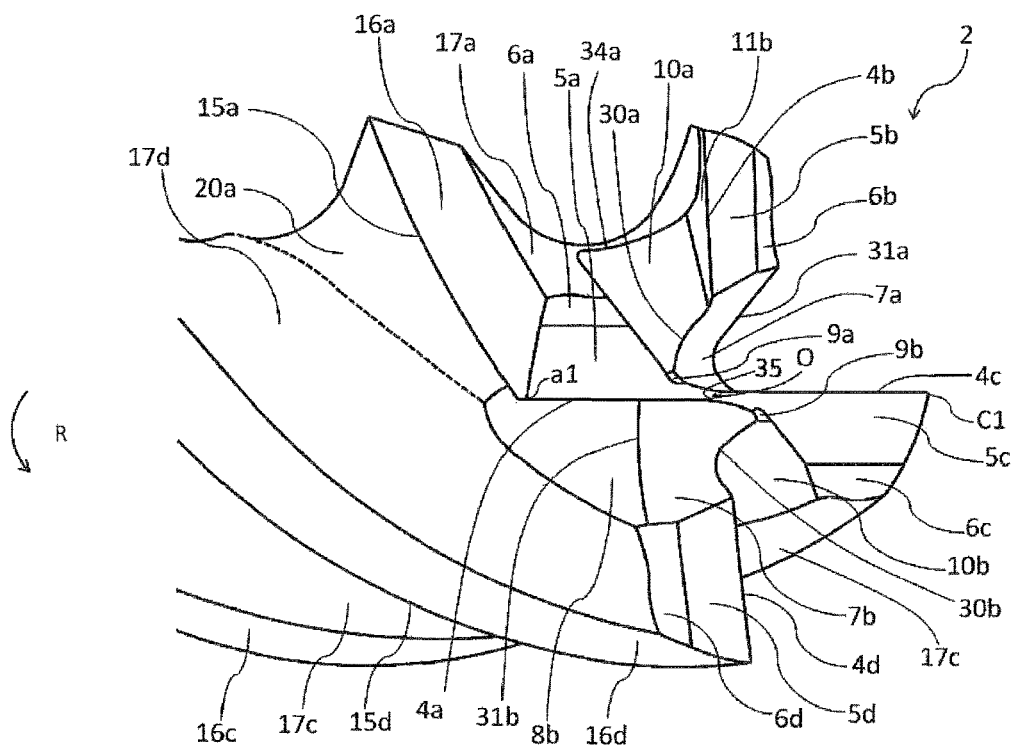
FIG. 4 is a perspective view illustrating the end face of FIG. 2 viewed from an outer peripheral side in a radial direction of a long end cutting edge.
Figure 5:
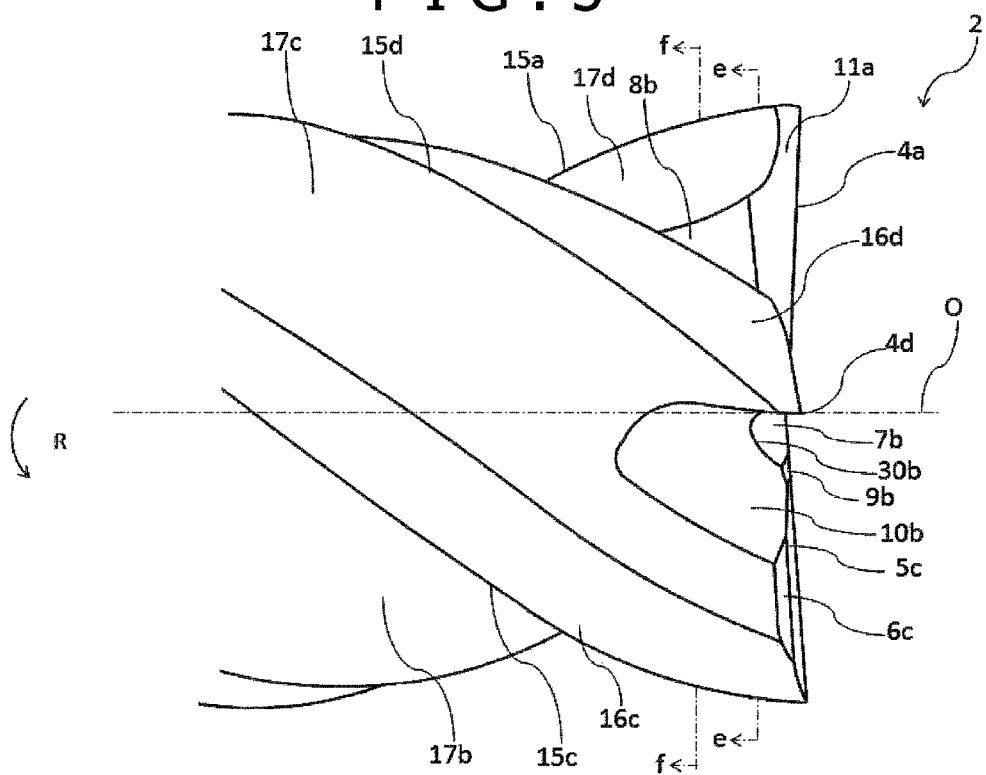
FIG. 5 is a side view illustrating a side face of the cutting edge portion of FIG. 2 viewed from the outer peripheral side in the radial direction of the short end cutting edge.
Figure 12:
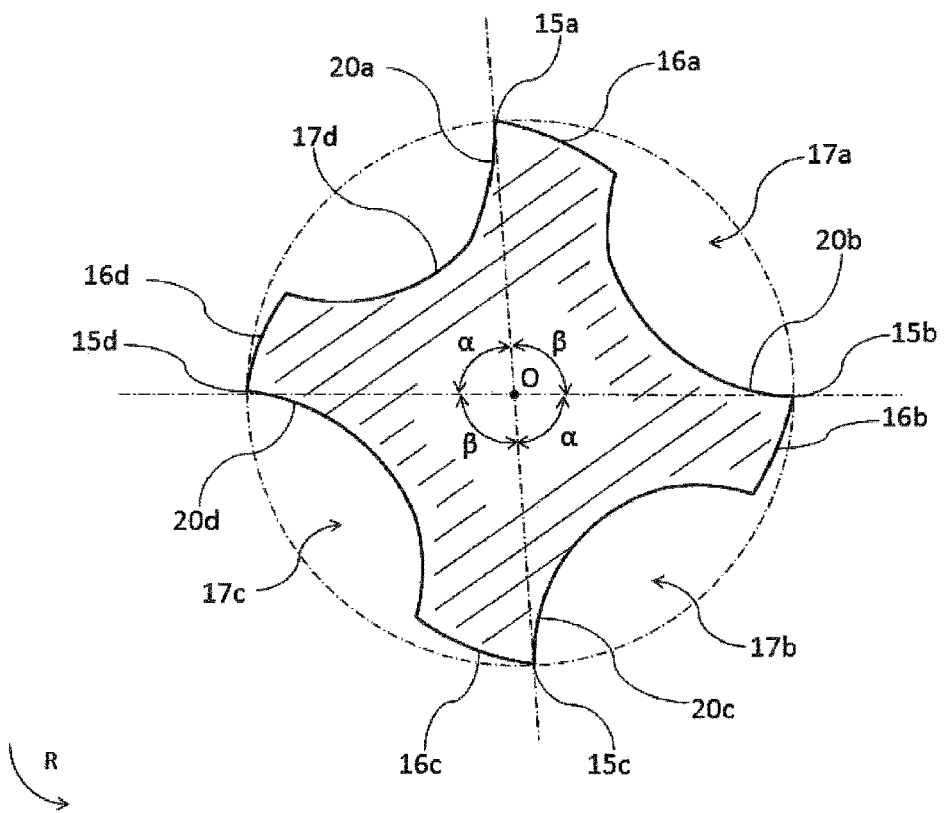
FIG. 12 is a cross-sectional view taken along a line a-a in FIG. 1.

On rear sides in the rotation direction of the respective peripheral cutting edges 15a to 15d, peripheral cutting edge second faces 16a to 16d are continuously disposed as peripheral cutting edge flanks as illustrated in FIG. 3 and FIG. 4, and on rear sides in the rotation direction of the peripheral cutting edge second faces 16a to 16d, the flutes 17a to 17d are disposed. The flutes 17a to 17d are formed between the peripheral cutting edge second faces 16a to 16d and the peripheral cutting edges 15b to 15a adjacent to the rear sides in the rotation direction of the peripheral cutting edge second faces 16a to 16d respectively. On front sides in the rotation direction of the peripheral cutting edge 15a to 15d, as illustrated in FIG. 12, peripheral cutting edge rake faces 20a to 20d are formed respectively. As illustrated in FIG. 3 and FIG. 4, the peripheral cutting edge rake faces 20a to 20d constitute the flutes 17d to 17a facing respectively, or are continuous with the flutes 17d to 17a, thus clear boundary lines with the flutes 17d to 17a do not necessarily appear. In FIG. 4, the boundary line between the flute 17d and the peripheral cutting edge rake face 20a is indicated by a dashed line, while the dashed line is not necessarily viewable.

Figure 7:
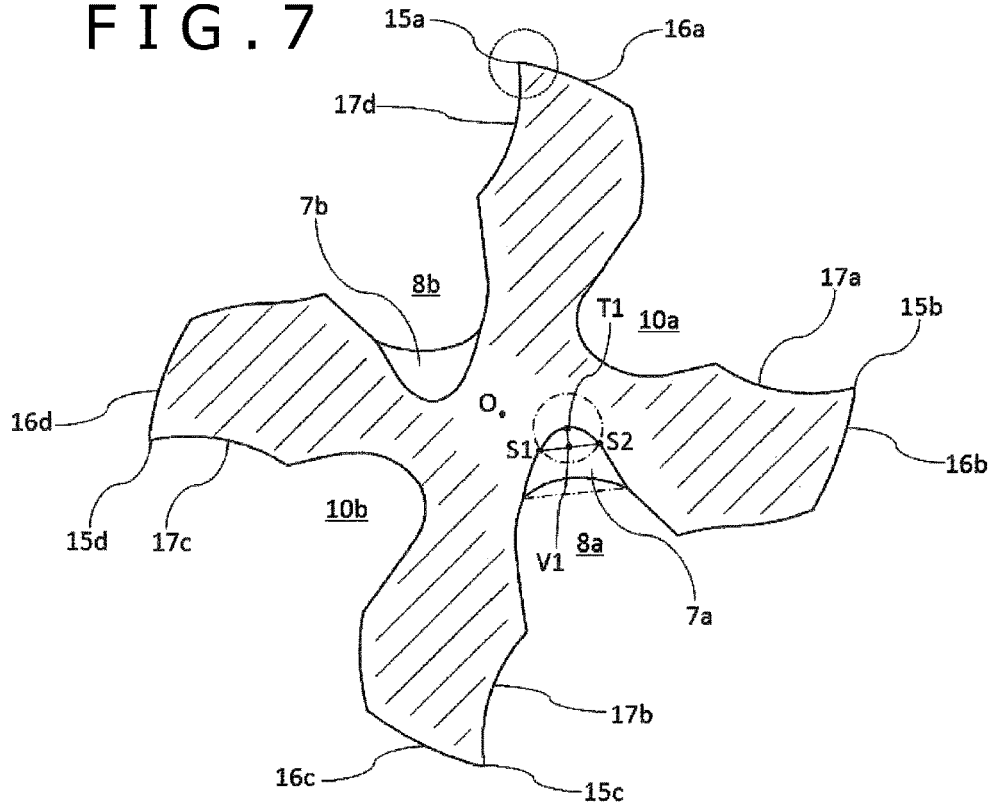
FIG. 7 is a cross-sectional view taken along a line e-e in FIG. 5.
Figure 13:
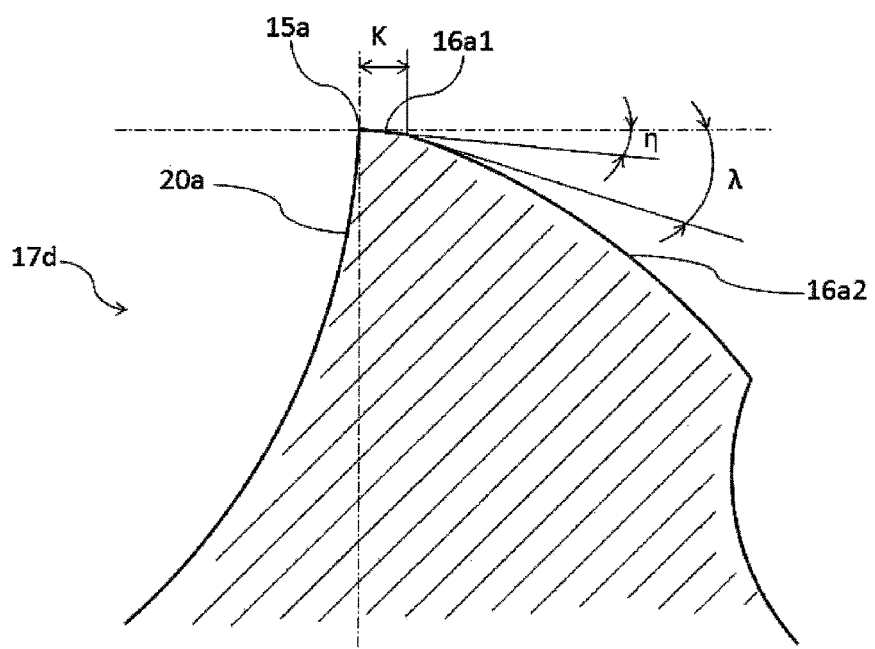
FIG. 13 is an enlarged view of a dashed circle part in FIG. 7.

The peripheral cutting edge second faces 16a (to 16d) is, in detail, divided into a minute second face 16a1 (to 16d1) having a minute width K in a circumferential direction and a main second face 16a2 (to 16d2), which is continuous from the rear side of the minute second face 16a1 (to 16d1) to the flute 17a (to 17d) and has a distance to the work material increased toward the rear side in the rotation direction, from the peripheral cutting edge 15a (to 15d) to the rear side in the rotation direction as illustrated in FIG. 13 as an enlarged view of a dashed circle part in FIG. 7. Here, when an angle between a straight line, which is perpendicular to a straight line, illustrated in FIG. 12, connecting the rotation axis O to the peripheral cutting edge 15a (to 15d) and illustrated by a dash-dotted line in FIG. 13, and a tangent line of the minute second face 16a1 (to 16d1) of the peripheral cutting edge 15a (to 15d) is η, and an angle between the straight line and a tangent line of the main second face 16a2 (to 16d2) is λ, it is appropriate that approximately $3.5° \leq η \leq 5.0°$, and $8° \leq λ \leq 15°$ as a guide. In one case, the minute second face 16a1 (to 16d1) and the main second face 16a2 (to 16d2) are planar surfaces, and the other case, the minute second face 16a1 (to 16d1) and the main second face 16a2 (to 16d2) are curved surfaces convex to the outer peripheral side in the radial direction.

As illustrated in FIG. 3 and FIG. 4, on front sides in the rotation direction of the long end cutting edges 4a and 4c and front sides in the rotation direction of the short end cutting edges 4b and 4d, long end cutting edge rake faces 11a and 11c and short end cutting edge rake faces 11b and 11d are formed respectively. On the front sides in the rotation direction of the long end cutting edge rake faces 11a and 11c, as illustrated in FIG. 3, the first gashes 7b and 7a and the second gashes 8b and 8a are continuously disposed, and on the front sides in the rotation direction of the short end cutting edge rake faces 11b and 11d, as illustrated in FIG. 4, the third gashes 10b and 10a are continuously disposed. Since the long end cutting edges 4a and 4c pass through near the center in the radial direction (the starting points a2 and c2), the long end cutting edge rake faces 11a and 11c are continuous with the first gashes 7b and 7a on sections closer to the center in the radial direction, and continuous with the second gashes 8b and 8a on sections closer to the outer periphery.

In FIG. 3, the sections closer to the center in the radial direction of the long end cutting edge rake faces 11a and 11c and the first gashes 7b and 7a form continuous depressed curved surfaces. In contrast, while the sections closer to the outer periphery in the radial direction of the long end cutting edge rake faces 11a and 11c and the second gashes 8b and 8a form discontinuous depressed curved surfaces to cause a clear boundary line to be appeared between both faces, the long end cutting edge rake faces 11a and 11c and both gashes form continuous curved surfaces in one case, and form discontinuous curved surfaces in the other case. In FIG. 3, a virtual boundary line 110, which does not clearly appear, between the long end cutting edge rake faces 11a and 11c and the first gashes 7b and 7a is indicated by a dashed line. In FIG. 4, while the short end cutting edge rake faces 11b and 11d and the third gashes 10b and 10a form the discontinuous curved surface, both faces form the continuous curved surface in some cases.

As illustrated in FIG. 2, the first boundary lines 30a and 30b are formed in bent curved lines such that the first boundary lines 30a and 30b once extend in a straight line to the center side in the radial direction continuous with the end portions b2 and d2 on the center side in the radial direction of the short end cutting edges 4b and 4d, project to the third gashes 10a and 10b sides on the front sides in the rotation direction in the middle, and subsequently, return to the second gashes 8a and 8b sides. The first boundary lines 30a and 30b extending to the third gashes 10a and 10b sides pass through the points c2 and a2 intersecting with the chisel edge 35 via the fourth gashes 9a and 9b described below, so as to be continuous with the long end cutting edges 4c and 4a.

The first boundary lines 30a and 30b starting from the starting points b2 and d2 of the short end cutting edges 4b and 4d once linearly extend to the center side in the radial direction, thus avoiding decrease of capacity for the chip in the third gashes 10a and 10b compared with a case where the first boundary lines 30a and 30b directly project to the front sides in the rotation direction from the starting points b2 and d2. The first boundary lines 30a and 30b project to the front sides in the rotation direction from points on the center side in the radial direction of the straight lines, and subsequently, extend in the bent curved lines connected to the starting points a2 and c2 of the long end cutting edges 4c and 4a, thus ensuring the enhance of the efficiency for guiding the chip in the first gashes 7a and 7b to the third gashes 10a and 10b.

From the end portions b2 and d2 on the center side in the radial direction of the short end cutting edges 4b and 4d, sixth boundary lines 37a and 37b are continuously disposed to form convex ridgelines to the rear sides in the rotation direction while partitioning the short end cutting edge flanks (the short end cutting edge second faces 5b and 5d and the short end cutting edge third faces 6b and 6d) and the first gashes 7b and 7a. The sixth boundary lines 37a and 37b intersect with boundary lines between the short end cutting edge flanks (the short end cutting edge third faces 6b and 6d) and the flutes 17b and 17d on the rear sides in the rotation direction of the short end cutting edge flanks on the intersections b3 and d3, and with the intersections b3 and d3, second boundary lines 31a and 31b and third boundary lines 32a and 32b described below intersect.

With the intersections b3 and d3 closer to the flutes 17b and 17d of the sixth boundary lines 37a and 37b, the second boundary lines 31a and 31b, which partitions the first gashes 7b and 7a and the second gashes 8b and 8a, formed in the convex ridgelines intersect, and the second boundary lines 31a and 31b are disposed to be continuous with the long end cutting edge rake faces 11a and 11c or the long end cutting edges 4c and 4a. The sixth boundary lines 37a and 37b formed in the convex ridgelines cause the first gashes 7a and 7b, which are the gashes partitioned by the sixth boundary lines 37a and 37b, to be concave (depressed) to the shank 3 side with respect to the sixth boundary lines 37a and 37b. Similarly, the second boundary lines 31a and 31b formed in the convex ridgelines cause the second gashes 8b and 8a, which are the gashes partitioned by the second boundary lines 31a and 31b and disposed relatively close to the flutes 17b and 17d, to be concave (depressed) to the shank 3 side with respect to the second boundary lines 31a and 31b.

From the intersections b3 and d3 closer to the long end cutting edges 4a and 4c on the rear sides in the rotation direction of the short end cutting edge flanks, the third boundary lines 32a and 32b, which partition the second gashes 8a and 8b and the flutes 17b and 17d, start for the long end cutting edges 4a and 4c to be formed in the convex ridgelines, and are continuous to the long end cutting edge rake faces 11a and 11c or the long end cutting edges 4a and 4c as illustrated in FIG. 2 and FIG. 3. The second gashes 8a and 8b are partitioned by the second boundary lines 31a and 31b, the third boundary lines 32a and 32b, and the long end cutting edge rake faces 11a and 11c or the long end cutting edges 4a and 4c. The third boundary lines 32a and 32b formed in the convex ridgelines cause the flutes 17b and 17d partitioned by the third boundary lines 32a and 32b to be concave (depressed) to the shank 3 side with respect to the third boundary lines 32a and 32b.

From points closer to the short end cutting edges 4b and 4d on the rear sides in the rotation direction of the long end cutting edge flanks (the long end cutting edge second faces 5a and 5c and the long end cutting edge third faces 6a and 6c), that is, the intersections a3 and c3 of the fourth boundary lines 36a and 36b with boundary lines on the rear sides in the rotation direction of the long end cutting edge flanks, the fifth boundary lines 34a and 34b start for the short end cutting edges 4b and 4d. The fifth boundary lines 34a and 34b are formed in the convex ridgelines to partition the third gashes 10a and 10b and the flutes 17a and 17c, and disposed continuous with the short end cutting edge rake faces 11b and 11d or the short end cutting edges 4b and 4d as illustrated in FIG. 4. The third gashes 10a and 10b are partitioned by the first boundary lines 30a and 30b, the fourth boundary lines 36a and 36b, the fifth boundary lines 34a and 34b, and the short end cutting edge rake faces 11b and 11d or the short end cutting edges 4b and 4d. The fifth boundary lines 34a and 34b formed in the convex ridgelines cause the flutes 17a and 17c partitioned by the fifth boundary lines 34a and 34b to be concave (depressed) to the shank 3 side with respect to the fifth boundary lines 34a and 34b.

Figure 11A:
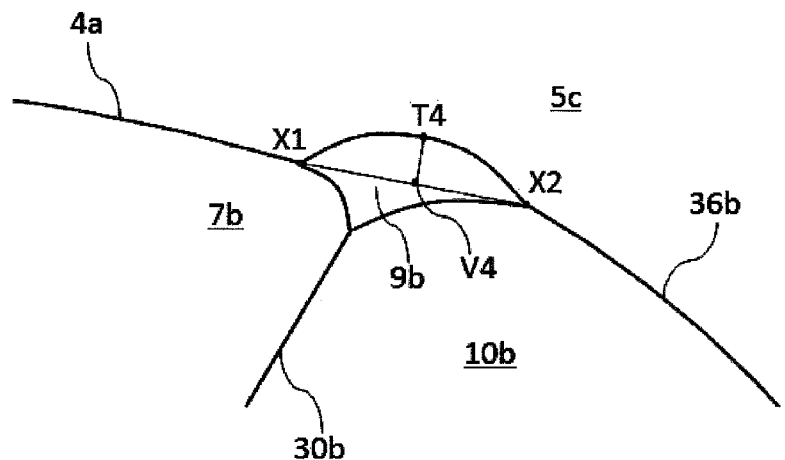
FIG. 11-(a) is an arrow view (perspective view) taken along a line d-d in FIG. 2.
Figure 11B:
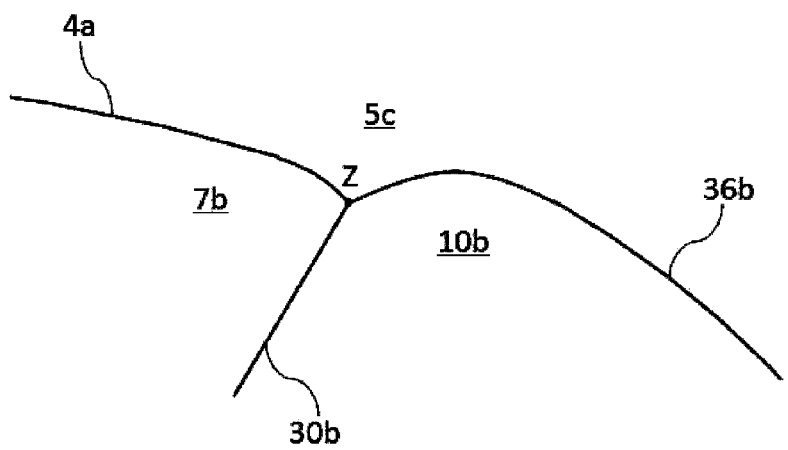

The intersections of the first boundary lines 30a and 30b with the fourth boundary lines 36a and 36b, that is, the points where the first boundary lines 30a and 30b shift (are bent) to the starting points a2 and c2 of the long end cutting edges 4a and 4c are originally protrusions z convex and pointed to the cutting edge portion 2 surface sides as illustrated in FIG. 11-(b). The protrusions z are possibly lost due to contacts with the work material during drilling machining, thus for preventing the loss, regions including the protrusions z are ground to be formed in the fourth gashes 9a and 9b such that the protrusions z does not appear as illustrated in FIG. 11-(a).

Specifically, the fourth gashes 9a and 9b are formed on the region from the end portions (the bent points) closer to the front in the rotation direction or closer to the center in the radial direction of the first boundary lines 30a and 30b as the boundary lines of the first gashes 7a and 7b and the third gashes 10a and 10b to the long end cutting edge second faces 5a and 5c on the rear sides in the rotation direction of the long end cutting edges 4a and 4c lying on the front sides in the rotation direction. "The regions from the bent points of the first boundary lines 30a and 30b to the long end cutting edge second faces 5a and 5c" are regions where the long end cutting edge second faces 5a and 5c intersect with the first gashes 7a and 7b and the third gashes 10a and 10b.

When the cutting edge portion 2 is viewed from the end face side in the axial direction, planar surfaces (regions) of the fourth gashes 9a and 9b are small compared with the first to the third gashes, thus the fourth gashes 9a and 9b contribute a little to the improvement of chip dischargeability, however, the fourth gashes 9a and 9b also formed in the depressed curved surfaces similar to the first to the third gashes when the cutting edge portion 2 is viewed from the end face side reduce the possibility of the contact with the work material, and contribute to the improvement of the chip dischargeability.

Here, examine appropriate degrees of curvatures of the depressed curved surfaces of the first gashes 7a and 7b, the second gashes 8b and 8a, the third gashes 10a and 10b, and the fourth gashes 9a and 9b that are formed in the curved surfaces depressed to the shank 3 side. For example, in a case where the first gash 7a has the surface formed in a cylindrical surface, when the cutting edge portion 2 is cut along a plane perpendicular to the rotation axis O, as illustrated in FIG. 7, the degree of the curvature of the first gash 7a is obtained as a ratio (n1/m1) of a length n1 to a length m1 where the length m1 is a length of a line segment connecting a S1 to a S2, the S1 and the S2 are intersections of edges of the first gash 7a with a circle having an apex T1 of a curved surface, which includes a curved line convex to the rotation axis O of the first gash 7a, as the center and having a diameter of 0.1D (D: tool diameter), and the length n1 is a length of a perpendicular from the T1 to the line segment (a midpoint V1).

In this case, when the m1 is constant, the degree of the curvature n1/m1 (curvature) decreases as the n1 is small. From the aspect of ensuring the rigidities of the long end cutting edges 4a and 4c and ensuring the volume of the first gash 7a, the degree of the curvature n1/m1 of the first gash 7a is appropriately 20 to 50%, and preferably 25 to 45%, especially, 30 to 40% is appropriate. The degree of the curvature n1/m1 of less than 20% causes the decrease of the rigidity of the long end cutting edges 4a and 4c, while the degree of the curvature n1/m1 of exceeding 50% decreases the volume of the first gash 7a due to the decrease of the chip dischargeability.

Figure 8:
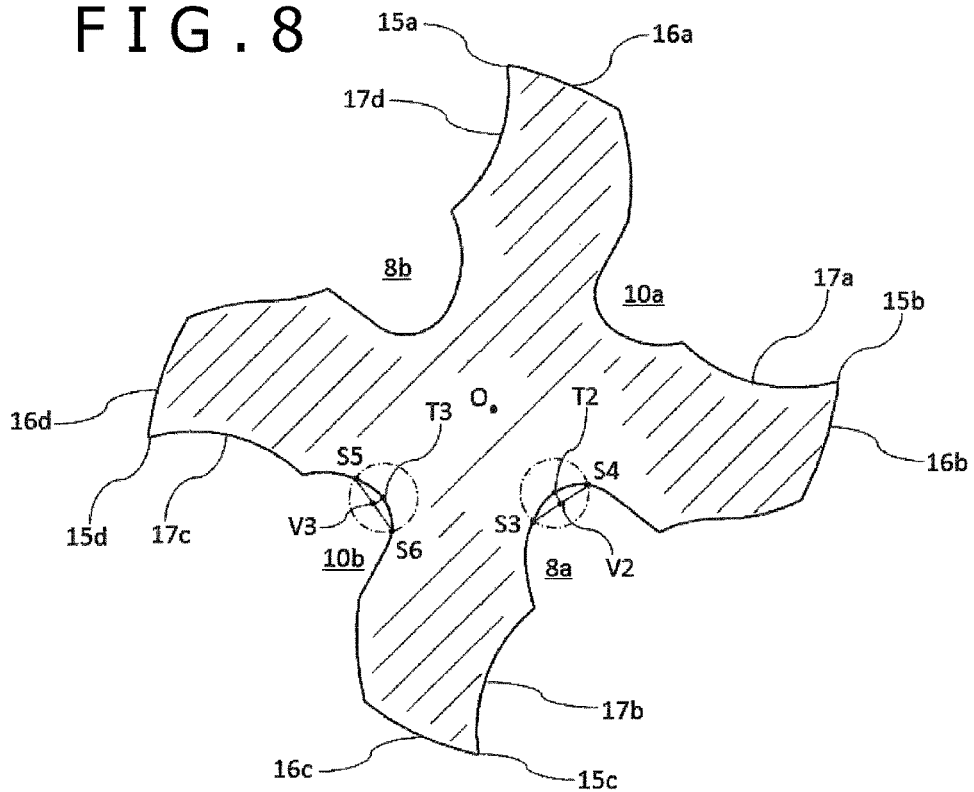
FIG. 8 is a cross-sectional view taken along a line f-f in FIG. 5.

The degree of the curvature of the second gash 8a is also obtained as a ratio (n2/m2) of a length n2 to a length m2 where, as illustrated in FIG. 8, the length m2 is a length of a line segment connecting a S3 to a S4, the S3 and the S4 are intersections of edges of the second gash 8a with a circle having an apex T2 as the center, the T2 is an apex of a curved surface obtained by cutting the cutting edge portion 2 along a cutting surface perpendicular to the rotation axis O and the curved surface includes a curved line convex to the rotation axis O of the second gash 8a, the circle has a diameter of 0.1D, and the length n2 is a length of a perpendicular from the T2 to the line segment (a midpoint V2). The degrees of the curvatures of the third gashes 10a and 10b are similar to this. The degree of the curvature n2/m2 of the second gash 8a and the degrees of the curvatures n3 (length from a T3 to a V3)/m3 of the third gashes 10a and 10b are each appropriately 10 to 40%, and preferably 15 to 35%, especially, 20 to 30% is appropriate from the aspect of ensuring the rigidities of the long end cutting edges 4a and 4c and the short end cutting edges 4b and 4d and ensuring the volumes of the second gash 8a and the third gash 10a.

For the chip, which is cut off by the long end cutting edges 4a and 4c and entered into the first gashes 7a and 7b, to be smoothly discharged to the flutes 17b and 17d via the second gashes 8a and 8b without staying, the degrees of the curvatures are preferred to be gradually loosened (decreased) from the first gashes 7a and 7b to the flutes 17b and 17d.

As illustrated in FIG. 11-(a), the degree of the curvature of the fourth gash 9b is obtained as a ratio (n4/m4) of a length n4 to a length m4 where the length m4 is a length of a line segment connecting an intersection X1 to an intersection X2, the intersection X1 is an intersection of the fourth gash 9b with the first gash 7b, the intersection X2 is an intersection of the fourth gash 9b with the third gash 10b, and the length n4 is a length of a perpendicular from an apex T4 of a curved line convex to the rotation axis O to the line segment (a midpoint V4). The degree of the curvature of the fourth gash 9b is appropriately 7 to 37%, and preferably 12 to 32%, especially 17 to 27% is appropriate from the aspect of ensuring the rigidities of the long end cutting edges 4a and 4c and avoiding the contact with the work material on the fourth gash 9b.

Detailed relations between the lengths of the first gashes 7a and 7b and the second gashes 8a and 8b in a direction along the long end cutting edges 4a and 4c and the tool diameter D, and detailed relations between the lengths of the third gashes 10a and 10b and the fourth gashes 9a and 9b in a direction along the short end cutting edges 4b and 4d and the tool diameter D are as follows.

In FIG. 2, assume that a point where the first gash 7b contacts the fourth gash 9b is A, and intersections of a straight line, indicated by a dash-dotted line, drawn from the point A parallel to the long end cutting edge 4a with the second boundary line 31b and the third boundary line 32b are B and C respectively, and when the lengths of the line segments AB and BC are lengths h1 and h2 of the first gash 7b and the second gash 8b respectively, approximately h1=0.13 to 0.33D and h2=0.07 to 0.27D are appropriate. When the h1 and the h2 are out of the range, the capacities of the chip in the respective gashes are possibly decreased, or smooth flows of the chip discharge from the first gashes 7a and 7b to the flutes 17b and 17d passing through the second gashes 8a and 8b are possibly inhibited.

In FIG. 2, assume that a point of the fourth gash 9b closer to the long end cutting edge 4c on the front side in the rotation direction is L, and intersections of a straight line, indicated by a dash-dotted line, drawn from the point L parallel to the short end cutting edge 4d with a seventh boundary line 33b and the fifth boundary line 34b are M and N respectively, and when the lengths of the line segments LM and MN are lengths h4 and h3 of the fourth gash 9b and the third gash 10b respectively, approximately h4=0.005 to 0.07D and h3=0.13 to 0.33D are appropriate. When the h3 is out of the range, the capacities of the chip in the third gashes 10a and 10b are possibly decreased, or smooth flows of the chip discharge to the flutes 17a and 17c passing through the third gashes 10a and 10b are possibly inhibited. When the h4 is out of the range, the peripheries of the fourth gashes 9a and 9b possibly contact the work materials, or the capacities of the chip in the third gashes 10a and 10b are possibly decreased.

Figure 9:
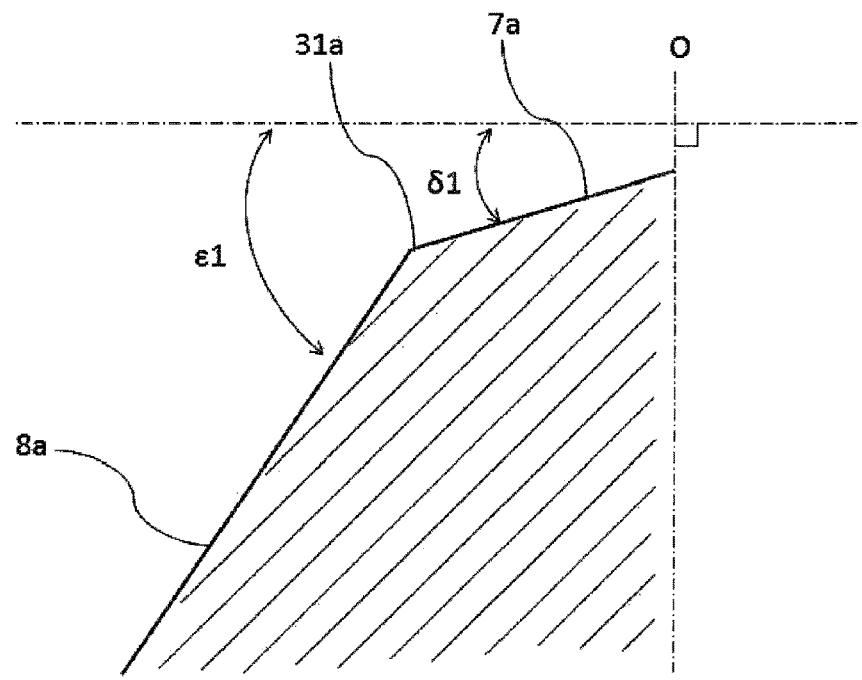
FIG. 9 is a cross-sectional view taken along a line b-b in FIG. 2.

As illustrated in FIG. 9 as a cross-sectional view taken along a line b-b in FIG. 2, formed angles (angles between the surfaces of the first gashes 7a and 7b in the proximity of the boundary lines (the second boundary line 31a) between the first gashes 7a and 7b and the second gashes 8a and 8b and planes perpendicular to the rotation axis O) δ1 of the first gashes 7a and 7b are appropriate in approximately 15 to 35°. The δ1 less than 15° possibly decreases the capacity of the chip in the first gashes 7a and 7b, while the δ1 exceeding 35° possibly decreases the rigidities of the long end cutting edges 4a and 4c.

Formed angles (angles between the surfaces of the second gashes 8a and 8b in the proximity of the boundary lines (the second boundary line 31a) between the first gashes 7a and 7b and the second gashes 8a and 8b and planes perpendicular to the rotation axis O) ε1 of the second gashes 8a and 8b illustrated in FIG. 9 are appropriate in approximately 40 to 60°. The ε1 less than 40° possibly decreases the capacity of the chip in the second gashes 8a and 8b, while the ε1 exceeding 60° possibly decreases the rigidities of the long end cutting edges 4a and 4c. The δ1 and the ε1 provided in the above-described ranges ensure the regions of the second gashes 8a and 8b lying on the outer peripheral sides in the radial direction to be wide with respect to the first gashes 7a and 7b while ensuring the rigidities of the long end cutting edges 4a and 4c near the rotation axis O where the cutting velocity is low and the chipping easily occurs, thus improving the chip dischargeability in both gashes.

Figure 10:
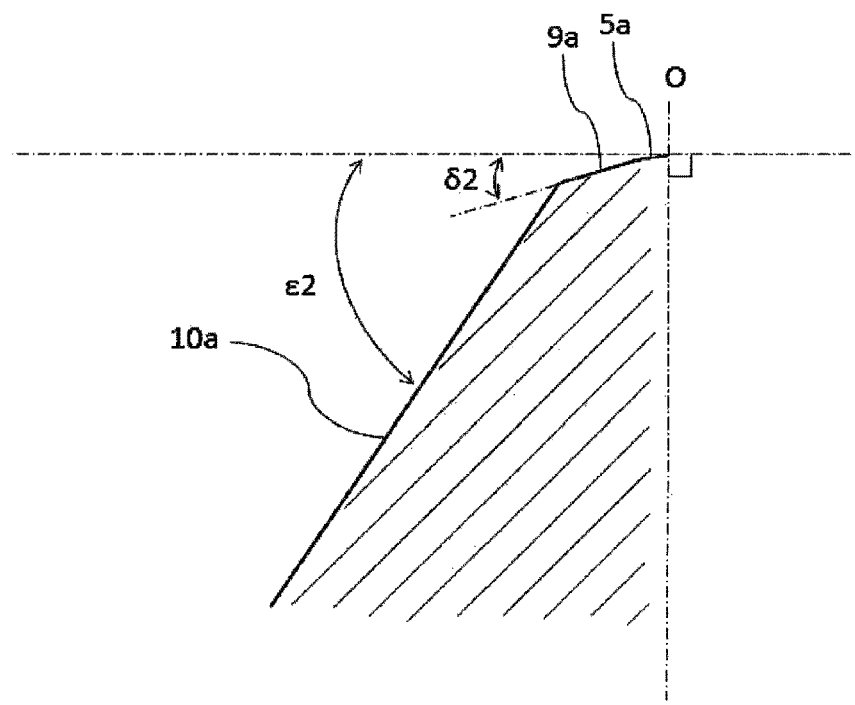
FIG. 10 is a cross-sectional view taken along a line c-c in FIG. 2.

As illustrated in FIG. 10 as a cross-sectional view taken along a line c-c in FIG. 2, formed angles (angles between the surfaces of the fourth gashes 9a and 9b in the proximity of the boundary lines (seventh boundary line 33a) between the third gashes 10a and 10b and the fourth gashes 9a and 9b and planes perpendicular to the rotation axis O) δ2 of the fourth gashes 9a and 9b, and formed angles (angles between the surfaces of the third gashes 10a and 10b in the proximity of the boundary lines (the seventh boundary line 33a) between the third gashes 10a and 10b and the fourth gashes 9a and 9b and planes perpendicular to the rotation axis O) ε2 of the third gashes 10a and 10b are appropriate in approximately 15 to 35° and approximately 40 to 60° respectively. The δ2 and the ε2 provided in this range ensure the regions of the third gashes 10a and 10b to be wide while ensuring the rigidities of the long end cutting edges 4a and 4c near the rotation axis O, thus improving the chip dischargeability in the third gashes 10a and 10b.

Figure 6:
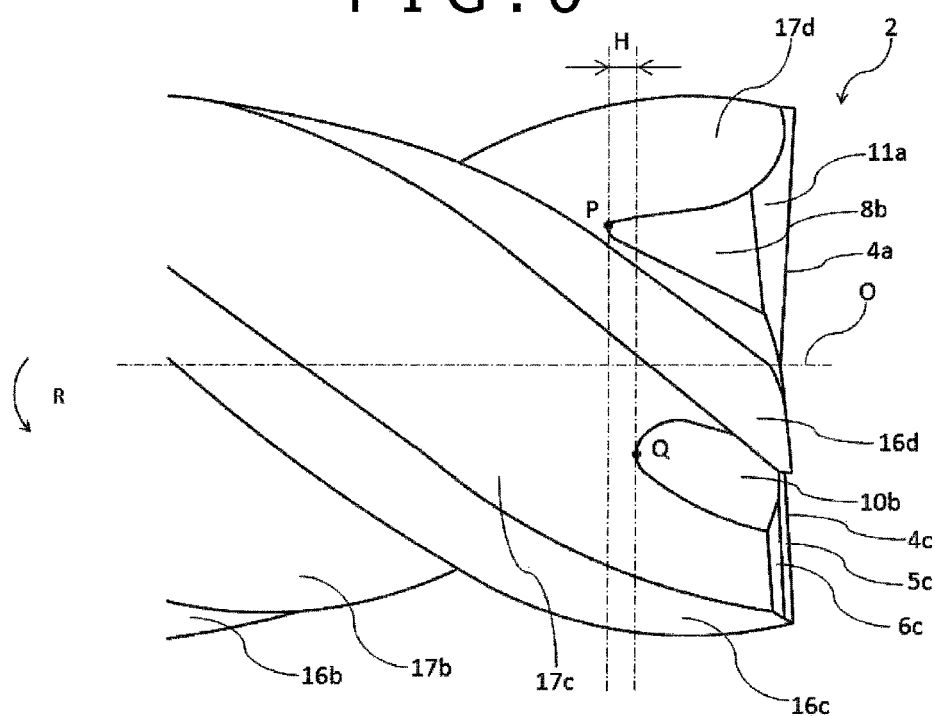
FIG. 6 is a side view illustrating the side face of the cutting edge portion of FIG. 2 viewed from an outer peripheral side in a radial direction of a peripheral cutting edge.

Furthermore, as illustrated in FIG. 6, focusing on positions of end portions P and Q on the outer peripheral sides in the radial direction of the second gashes 8a and 8b continuous with the flutes 17b to 17a and the third gashes 10a and 10b, it is appropriate that the end portions Q of the third gashes 10a and 10b is positioned closer to the end cutting edges 4a to 4d with respect to the end portions P of the second gashes 8a and 8b in the rotation axis O direction (claim 9).

Because of differences of the formed positions and the respective functions between the long end cutting edges 4a and 4c and the short end cutting edges 4b and 4d on the cutting edge portion 2, the size of the chip generated by the short end cutting edges 4b and 4d is relatively smaller than the size of the chip generated by the long end cutting edges 4a and 4c. Then, even the third gashes 10a and 10b, formed on the front sides in the rotation direction of the short end cutting edges 4b and 4d, are disposed to have a decreased length in the rotation axis O direction compared with the second gashes 8a and 8b formed on the front sides in the rotation direction of the long end cutting edges 4a and 4c, the chip dischargeability via the third gashes 10a and 10b can be said to be sufficiently ensured.

On the other hand, positioning the end portions Q on the outer peripheral sides in the radial direction of the third gashes 10a and 10b closer to the end cutting edges 4a to 4d with respect to the end portions P on the outer peripheral sides in the radial direction of the second gashes 8a and 8b (claim 9) reduces the lengths of the third gashes 10a and 10b in the rotation axis O direction, thus eliminating the need for providing the volumes more than necessary to the third gashes 10a and 10b. This ensures reducing the decrease of the rigidities of the end mill 1 itself, or the cutting edge portion 2 or the short end cutting edges 4b and 4d.

In FIG. 6 viewing the end mill 1 from the outer peripheral side in the radial direction, distances H in the rotation axis O direction between the end portions P of the second gashes 8a and 8b and the end portions Q of the third gashes 10a and 10b are appropriate in approximately 0.01 to 0.2D (D: tool diameter). Since the H less than 0.01D provides no substantial difference between the positions of the end portion P and the end portion Q, the rigidity of the end mill 1 or a part of the end mill 1 easily decreases, while the H exceeding 0.2D easily provides the possibility for a grinding wheel to contact the long end cutting edges 4a and 4c during grinding the short end cutting edges 4b and 4d with the grinding wheel.

As illustrated in FIG. 12 as a cross-sectional view taken along a line a-a in FIG. 1, from the aspect of reducing chatter vibration caused by resonance during cutting the work material, the end mill 1 of the present invention is preferably an unequally divided type where center angles connecting the peripheral cutting edges 15a and 15b (15b and 15c) adjacent in a circumferential direction (the rotation direction) are not identical. While FIG. 12 indicates the center angles (dividing angles) α and β where the center angles α and β on point symmetry positions with respect to the rotation axis O are identical and the sum of the adjacent center angles α and β is 180°, all the center angles may be different.

As FIG. 12 illustrating a case of four cutting edges, when the center angle 360° of the circle is divided in the number of the cutting edges so as to have the sum of the adjacent center angles α and β to be 180°, the relatively large center angle β is mainly configured to be in a range increased by approximately 2 to 20% of 90° (reference angle) obtained by dividing the center angle of the circle in four, and preferably configured to be in a range increased by approximately 4 to 12%. In a case of increasing by 2%, the center angle β is approximately 92°, and the adjacent center angle α is 88°. In a case of increasing by 20%, the center angle β is 108°, and the adjacent center angle α is 72°. The center angle β less than increased by 2% of the reference angle provides no efficiency for reducing the chatter vibration, while the center angle β exceeding increased by 20% provides an excessive volume of the flute having the center angle β, thus easily causing the chipping on the peripheral cutting edges.

DESCRIPTION OF REFERENCE SIGNS

1 . . . end mill (end mill main body)
2 . . . cutting edge portion, 3 . . . shank
4a, 4c . . . long end cutting edge, 4b and 4d . . . short end cutting edge
5a, 5c . . . long end cutting edge second face, 5b, 5d . . . short end cutting edge second face
6a, 6c . . . long end cutting edge third face, 6b, 6d . . . short end cutting edge third face
7a and 7b . . . first gash, 8a, 8b . . . second gash
9a, 9b . . . fourth gash, 10a, 10b . . . third gash
11a, 11c . . . long end cutting edge rake face, 11b, 11d . . . short end cutting edge rake face
15a, 15b, 15c, 15d . . . peripheral cutting edge
16a, 16b, 16c, 16d . . . peripheral cutting edge second faces
16a1, 16b1, 16c1, 16d1 . . . minute second face of peripheral cutting edge
16a2, 16b2, 16c2, 16d2 . . . main second face of peripheral cutting edge
17a, 17b, 17c, 17d . . . flute
20a, 20b, 20c, 20d . . . peripheral cutting edge rake face
30a, 30b . . . boundary line between first gash and third gash (first boundary line)
31a, 31b . . . boundary line between first gash and second gash (second boundary line)
32a, 32b . . . boundary line between second gash and flute (third boundary line)
33a, 33b . . . boundary line between third gash and fourth gash (seventh boundary line)
34a, 34b . . . boundary line between third gash and flute (fifth boundary line)
35 . . . chisel edge
36a, 36b . . . boundary line between third gash and long end cutting edge flank (fourth boundary line)
37a, 37b . . . boundary line between first gash and short end cutting edge flank (sixth boundary line)
110 . . . virtual boundary line between long end cutting edge rake face and first gash
a1, c1 . . . end portion on outer peripheral side in radial direction of long end cutting edge (connecting point of long end cutting edge and peripheral cutting edge)
a2, c2 . . . end portion on center side in radial direction of long end cutting edge a3, c3 . . . intersection of fourth boundary line with boundary line on rear side in rotation direction of long end cutting edge flank
b1 and d1 . . . end portion on outer peripheral side in radial direction of short end cutting edge (connecting point of short end cutting edge with peripheral cutting edge)
b2 and d2 . . . end portion on center side in radial direction of short end cutting edge (boundary of first boundary line and short end cutting edge)
b3, d3 . . . intersection of sixth boundary line with boundary line on rear side in rotation direction of short end cutting edge flank
b4, d4 . . . intersection of boundary line (fifth boundary line) between third gash and flute with short end cutting edge or short end cutting edge rake face
D . . . tool diameter
H . . . distance in rotation axis direction between end portion P of second gash and end portion Q of third gash
K . . . width in circumferential direction of minute second face
m1, m2, m3, m4: length of convex curved surface
n1, n2, n3, n4 . . . height of convex curved surface
O . . . rotation axis,
P . . . end portion on outer peripheral side in radial direction of second gash
Q . . . end portion on outer peripheral side in radial direction of third gash
R . . . rotation direction
S1, S2, S3, S4, S5, S6 . . . intersection of virtual circle with gash
T1, T2, T3, T4 . . . apex of curved surface of gash
X1 . . . intersection of fourth gash with first gash, X2 . . . intersection of fourth gash with third gash
z . . . protrusion
α, β . . . center angle between adjacent peripheral cutting edges (dividing angle)
δ1 . . . formed angle of first gash, δ2 . . . formed angle of third gash
ε1 . . . formed angle of second gash, ε2 . . . formed angle of fourth gash
η . . . minute second angle, λ . . . main second angle
θa, θb, θc, θd . . . angle of end cutting edge with respect to straight line connecting rotation axis O to each connecting point

The invention claimed is:

1. An end mill comprising;
a cutting edge portion that includes an end cutting edge and a peripheral cutting edge disposed on a tip side in an axial direction of a tool body, the end cutting edge being disposed from a center side to an outer peripheral side in a radial direction, the peripheral cutting edge being continuous with the end cutting edge, wherein
the end cutting edge includes at least one long end cutting edge and at least two short end cutting edges, the long end cutting edge is continuously disposed from an end portion on the outer peripheral side in the radial direction to closer to a center in the radial direction when the cutting edge portion is viewed from an end face side in an axial direction, and the short end cutting edges are continuously disposed from other end portions on the outer peripheral side in the radial direction to middles on the center side in the radial direction when the cutting edge portion is viewed from the end face side in the axial direction, and
the short end cutting edges each include a first gash on a region from a line connecting the end portion on the center side in the radial direction to a proximity of the center in the radial direction to each of the long end cutting edges on rear sides in the rotation direction, the first gash has a rear side in the rotation direction and a front side in the rotation direction where a second gash and a third gash are formed respectively, and the first gash, the second gash, and the third gash are formed in curved surface shapes depressed to a shank side on an opposite side in the axial direction of the cutting edge portion when the cutting edge portion is viewed from the end face side in the axial direction.

2. The end mill according to claim 1, wherein the third gash and the second gash are disposed across the first gash, and arranged along the long end cutting edges.

3. The end mill according to claim 1, wherein when the cutting edge portion is viewed from the end face side in the axial direction, a boundary line is continuously disposed from the end portion on the center side in the radial direction of the short end cutting edge on a front side in a rotation direction R of the first gash, the boundary line once extends to the center side in the radial direction, projects to the third gash side, and returns to the second gash side so as to be continuous to the end portion on the center side in the radial direction of the long end cutting edge.

4. The end mill according to claim 1, wherein the boundary line between the third gash and the first gash is formed in a ridgeline convex to the end face side of the cutting edge portion.

5. The end mill according to claim 1, wherein a boundary line between the second gash and the first gash is formed in a ridgeline convex to the end face side of the cutting edge portion.

6. The end mill according claim 4, wherein the third gash has a face excluding the boundary line with the first gash deepened with respect to the boundary line with the first gash and depressed with respect to the boundary line when the cutting edge portion is viewed from the end face side in the axial direction.

7. The end mill according to claim 1, wherein the third gash has a boundary line with a flute continuous to a rear side in the rotation direction, the boundary line is continuous with the short end cutting edge or a rake face of the short end cutting edge, and the end portion on the center side in the radial direction of the short end cutting edge is positioned on the center side in the radial direction with respect to an intersection of the boundary line between the third gash and the flute with the short end cutting edge or the short end cutting edge rake face when the cutting edge portion is viewed from the end face side in the axial direction.

8. The end mill according to claim 1, wherein a fourth gash is disposed on a region from the end portion closer to front in the rotation direction or closer to the center in the radial direction on the boundary line between the first gash and the third gash to a rear side in the rotation direction of the long end cutting edge lying on a front side in the rotation direction of the end portion.

9. The end mill according to claim 1, wherein the third gash has an end portion Q on the outer peripheral side in the radial direction, the end portion Q is positioned closer to the end cutting edge with respect to an end portion P on an outer peripheral side in the radial direction of the second gash.

10. The end mill according to claim 2, wherein when the cutting edge portion is viewed from the end face side in the axial direction, a boundary line is continuously disposed from the end portion on the center side in the radial direction of the short end cutting edge on a front side in a rotation direction R of the first gash, the boundary line once extends to the center side in the radial direction, projects to the third gash side, and returns to the second gash side so as to be continuous to the end portion on the center side in the radial direction of the long end cutting edge.

11. The end mill according to claim 2, wherein the boundary line between the third gash and the first gash is formed in a ridgeline convex to the end face side of the cutting edge portion.

12. The end mill according to claim 2, wherein a boundary line between the second gash and the first gash is formed in a ridgeline convex to the end face side of the cutting edge portion.

13. The end mill according to claim 3, wherein a boundary line between the second gash and the first gash is formed in a ridgeline convex to the end face side of the cutting edge portion.

14. The end mill according claim 5, wherein the third gash has a face excluding the boundary line with the first gash deepened with respect to the boundary line with the first gash and depressed with respect to the boundary line when the cutting edge portion is viewed from the end face side in the axial direction.

15. The end mill according to claim 2, wherein the third gash has a boundary line with a flute continuous to a rear side in the rotation direction, the boundary line is continuous with the short end cutting edge or a rake face of the short end cutting edge, and the end portion on the center side in the radial direction of the short end cutting edge is positioned on the center side in the radial direction with respect to an intersection of the boundary line between the third gash and the flute with the short end cutting edge or the short end cutting edge rake face when the cutting edge portion is viewed from the end face side in the axial direction.

16. The end mill according to claim 3, wherein the third gash has a boundary line with a flute continuous to a rear side in the rotation direction, the boundary line is continuous with the short end cutting edge or a rake face of the short end cutting edge, and the end portion on the center side in the radial direction of the short end cutting edge is positioned on the center side in the radial direction with respect to an intersection of the boundary line between the third gash and the flute with the short end cutting edge or the short end cutting edge rake face when the cutting edge portion is viewed from the end face side in the axial direction.

17. The end mill according to claim 2, wherein a fourth gash is disposed on a region from the end portion closer to front in the rotation direction or closer to the center in the radial direction on the boundary line between the first gash and the third gash to a rear side in the rotation direction of the long end cutting edge lying on a front side in the rotation direction of the end portion.

18. The end mill according to claim 3, wherein a fourth gash is disposed on a region from the end portion closer to front in the rotation direction or closer to the center in the radial direction on the boundary line between the first gash and the third gash to a rear side in the rotation direction of the long end cutting edge lying on a front side in the rotation direction of the end portion.

19. The end mill according to claim 2, wherein
the third gash has an end portion Q on the outer peripheral side in the radial direction, the end portion Q is positioned closer to the end cutting edge with respect to an end portion P on an outer peripheral side in the radial direction of the second gash.

20. The end mill according to claim 3, wherein
the third gash has an end portion Q on the outer peripheral side in the radial direction, the end portion Q is positioned closer to the end cutting edge with respect to an end portion P on an outer peripheral side in the radial direction of the second gash.

* * * * *

UNITED STATES PATENT AND TRADEMARK OFFICE
CERTIFICATE OF CORRECTION

PATENT NO. : 10,307,839 B2
APPLICATION NO. : 15/558120
DATED : June 4, 2019
INVENTOR(S) : Katsutoshi Maeda Page 1 of 1

It is certified that error appears in the above-identified patent and that said Letters Patent is hereby corrected as shown below:

In the Claims

Column 23, Line 34, In Claim 6, after "according" insert -- to --.

Column 24, Line 24, In Claim 14, after "according" insert -- to --.

Signed and Sealed this
Third Day of September, 2019

Andrei Iancu
*Director of the United States Patent and Trademark Office*